US006343349B1

United States Patent
Braun et al.

(10) Patent No.: US 6,343,349 B1
(45) Date of Patent: Jan. 29, 2002

(54) MEMORY CACHING FOR FORCE FEEDBACK EFFECTS

(75) Inventors: Adam C. Braun, Sunnyvale; Jonathan L. Beamer, Menlo Park; Dean C. Chang, Santa Clara, all of CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 09/401,564

(22) Filed: Sep. 22, 1999

Related U.S. Application Data

(63) Continuation of application No. 09/305,872, filed on May 5, 1999, which is a continuation-in-part of application No. 08/970,953, filed on Nov. 14, 1997.

(51) Int. Cl.[7] .............................................. G06F 12/00
(52) U.S. Cl. ........................ 711/154; 711/133; 711/159; 711/118; 710/57; 345/701; 345/702; 341/27
(58) Field of Search ................................ 711/118, 133, 711/134, 135, 136, 167, 154, 159; 710/57; 341/20, 27; 345/701, 702

(56) References Cited

U.S. PATENT DOCUMENTS

| 3,919,691 A | 11/1975 | Noll |
| 4,414,984 A | 11/1983 | Zarudiansky |
| 4,477,043 A | 10/1984 | Repperger |
| 4,560,983 A | 12/1985 | Williams |
| 4,604,016 A | 8/1986 | Joyce |
| 4,706,294 A | 11/1987 | Ouchida |
| 4,734,685 A | 3/1988 | Watanabe |
| 4,782,327 A | 11/1988 | Kley et al. |
| 4,800,721 A | 1/1989 | Cemenska et al. |
| 4,823,634 A | 4/1989 | Culver |
| 4,837,734 A | 6/1989 | Ichikawa et al. |
| 4,949,119 A | 8/1990 | Moncrief et al. |
| 4,961,038 A | 10/1990 | MacMinn |
| 4,983,901 A | 1/1991 | Lehmer |
| 5,044,956 A | 9/1991 | Behensky |

(List continued on next page.)

FOREIGN PATENT DOCUMENTS

| EP | 0085518 A1 | 8/1983 |
| EP | 0265011 A1 | 4/1988 |
| EP | 0607580 A1 | 7/1994 |
| EP | 0626634 A2 | 11/1994 |
| EP | 0875819 A1 | 11/1998 |

(List continued on next page.)

OTHER PUBLICATIONS

Rosenberg, "Virtual Fixtures as Tools to Enhance Operator Performance in Telepresence Environments," 1993, SPIE Telemanipulator Technology.
Gotow, "Perception of Mechanical Properties at the Man–Machine Interface," 1987, IEEE.
Ouh–young et al., "Creating an Illusion of Feel: Control Issues in Force Display," Sep. 1989, Computer Science Dept., Univ. of No. Carolina.
B. Hannaford et al., "Force–Feeback Cursor Control," NASA Tech Briefs, vol. 13, No. 11, Item #21, 1989, pp. 1–4.

(List continued on next page.)

Primary Examiner—Matthew Kim
Assistant Examiner—Matthew D. Anderson
(74) Attorney, Agent, or Firm—James R. Riegel

(57) ABSTRACT

Methods and apparatus for efficient management of memory in a force feedback system including a host computer and a force feedback device. A representation of device memory is maintained on the host computer to allow the host computer knowledge and control over storage and force effects in the device memory. A host cache for force effects is provided to allow almost unlimited numbers of force effects to be created for the device, where any force effects not able to fit in device memory are stored in the host cache.

12 Claims, 9 Drawing Sheets

U.S. PATENT DOCUMENTS

| | | |
|---|---|---|
| 5,076,517 A | 12/1991 | Ferranti et al. |
| 5,103,404 A | 4/1992 | McIntosh |
| 5,116,180 A | 5/1992 | Fung et al. |
| 5,146,566 A | 9/1992 | Hollis, Jr. et al. |
| 5,181,181 A | 1/1993 | Glynn |
| 5,184,319 A | 2/1993 | Kramer |
| 5,185,561 A | 2/1993 | Good et al. |
| 5,186,629 A | 2/1993 | Rohen |
| 5,189,355 A | 2/1993 | Larkins et al. |
| 5,193,175 A * | 3/1993 | Cutts, Jr. et al. ............. 714/11 |
| 5,193,963 A | 3/1993 | McAffee et al. |
| 5,197,003 A | 3/1993 | Moncrief et al. |
| 5,220,260 A | 6/1993 | Schuler |
| 5,223,776 A | 6/1993 | Radke et al. |
| 5,235,868 A | 8/1993 | Culver |
| 5,264,768 A | 11/1993 | Gregory et al. |
| 5,275,565 A | 1/1994 | Moncrief |
| 5,286,203 A | 2/1994 | Fuller et al. |
| 5,296,871 A | 3/1994 | Paley |
| 5,341,459 A | 8/1994 | Backes |
| 5,354,162 A | 10/1994 | Burdea et al. |
| 5,366,376 A | 11/1994 | Copperman et al. |
| 5,384,906 A * | 1/1995 | Horst ........................ 709/400 |
| 5,389,865 A | 2/1995 | Jacobus et al. |
| 5,396,266 A | 3/1995 | Brimhall |
| 5,405,152 A | 4/1995 | Katanics et al. |
| 5,414,337 A | 5/1995 | Schuler |
| 5,414,620 A | 5/1995 | Kauffman |
| 5,428,748 A | 6/1995 | Davidson et al. |
| 5,477,237 A | 12/1995 | Parks |
| 5,491,477 A | 2/1996 | Clark et al. |
| 5,513,100 A | 4/1996 | Parker et al. |
| 5,570,111 A | 10/1996 | Barrett et al. |
| 5,576,727 A | 11/1996 | Rosenberg et al. |
| 5,589,828 A | 12/1996 | Armstrong |
| 5,589,854 A | 12/1996 | Tsai |
| 5,596,347 A | 1/1997 | Robertson |
| 5,623,582 A | 4/1997 | Rosenberg |
| 5,625,576 A | 4/1997 | Massie et al. |
| 5,629,594 A | 5/1997 | Jacobus et al. |
| 5,634,794 A | 6/1997 | Hildreth et al. |
| 5,642,469 A | 6/1997 | Hannaford et al. |
| 5,643,087 A | 7/1997 | Marcus et al. |
| 5,666,138 A | 9/1997 | Culver |
| 5,691,898 A | 11/1997 | Rosenberg et al. |
| 5,694,013 A | 12/1997 | Stewart et al. |
| 5,704,791 A | 1/1998 | Gillio |
| 5,709,219 A | 1/1998 | Chen et al. |
| 5,714,978 A | 2/1998 | Yamanaka et al. |
| 5,721,566 A | 2/1998 | Rosenberg et al. |
| 5,734,373 A | 3/1998 | Rosenberg et al. |
| 5,736,978 A | 4/1998 | Hasser et al. |
| 5,739,811 A | 4/1998 | Rosenberg et al. |
| 5,742,278 A | 4/1998 | Chen et al. |
| 5,755,577 A | 5/1998 | Gillio |
| 5,760,764 A | 6/1998 | Martinelli |
| 5,767,839 A | 6/1998 | Rosenberg |
| 5,769,640 A | 7/1998 | Jacobus et al. |
| 5,781,172 A | 7/1998 | Engel et al. |
| 5,784,052 A | 7/1998 | Keyson |
| 5,790,108 A | 8/1998 | Salcudean et al. |
| 5,802,353 A | 9/1998 | Avila et al. |
| 5,805,140 A | 9/1998 | Rosenberg et al. |
| 5,825,308 A | 10/1998 | Rosenberg |
| 5,844,392 A | 12/1998 | Peurach et al. |
| 5,889,672 A | 3/1999 | Schuler et al. |
| 5,944,151 A | 8/1999 | Jakobs et al. |
| 5,956,016 A | 9/1999 | Kuenzner et al. |
| 5,956,484 A | 9/1999 | Rosenberg et al. |
| 5,959,613 A | 9/1999 | Rosenberg et al. |
| 5,973,689 A | 10/1999 | Gallery |
| 5,990,869 A | 11/1999 | Kubica et al. |
| 5,999,168 A | 12/1999 | Rosenberg et al. |
| 6,004,134 A | 12/1999 | Marcus et al. |
| 6,005,551 A | 12/1999 | Osborne et al. |
| 6,020,876 A | 2/2000 | Rosenberg et al. |
| 6,028,593 A | 2/2000 | Rosenberg et al. |
| 6,078,308 A | 6/2000 | Rosenberg et al. |
| 6,088,017 A | 6/2000 | Tremblay et al. |
| 6,084,587 A | 7/2000 | Tarr et al. |
| 6,088,019 A | 7/2000 | Rosenberg |
| 6,100,874 A | 8/2000 | Schena et al. |
| 6,104,158 A | 8/2000 | Jacobus et al. |
| 6,111,562 A | 8/2000 | Downs et al. |
| 6,111,577 A | 8/2000 | Zilles et al. |
| 6,125,385 A | 9/2000 | Wies et al. |
| 6,131,097 A | 10/2000 | Peurach et al. |
| 6,252,583 B1 | 6/2001 | Braun et al. |

FOREIGN PATENT DOCUMENTS

| | | |
|---|---|---|
| WO | WO9200559 | 1/1992 |
| WO | WO9520788 | 8/1995 |
| WO | 95/20788 | 8/1995 |
| WO | WO9532459 | 11/1995 |
| WO | WO9628777 | 9/1996 |
| WO | WO9721160 | 6/1997 |
| WO | 97/31333 | 8/1997 |
| WO | 98/49614 | 11/1998 |
| WO | 98/58308 | 12/1998 |

OTHER PUBLICATIONS

L. Rosenberg et al., "Commercially Viable Force Feedback Controller for Individuals w/Neuromotor Disabilities," Wright Patterson AFB, 1996, pp. 1–33.

Payette, Jule et al., "Evaluation of a Force Feedback (Haptic) Computer pointing Device in Zero Gravity," Dynamic Systems & Control Div. DSC–vol. 58, ASME 1996, pp. 547–553.

Colgate, J. Edward et al., "Implementation of Stiff Virtual Walls in Force–Reflecting Interfaces," Northwestern University, 1993, pp. 1–7.

Louis Rosenberg, "Perceptual Design of a Virtual Rigid Surface Contact," Stanford University, Wright Patterson AFB, 1993, pp. 1–40.

Louis Rosenberg et al., "The use of force feedback to enhance graphical user interfaces", Stereoscopic Displays and Virtual Reality Systems III, Proc. SPIE, 1996, pp. 243–248.

Schmidt, Brian et al., "Application Areas for Force–Feedback Joystick," DSC–vol. 49, Advances in Robotics, Mechatronics, and Haptic Interfaces, ASME 1993, pp. 47–54.

Minsky, Margaret et al., "Feeling and Seeing: Issues in Force Display," University of North Carolina, ACM 1990, pp. 235–242, 270.

Ramstein, Christophe, "Combining Haptic & Braille Technologies: Design Issues and Pilot Study," Assets '96, ACM 0–89791–776–6, 1996, pp.37–44.

Munch, Stefan et al., "Intelligent Control for Haptic Displays," Eurographics '96, vol. 15, No. 3, Blackwell Publishers, 1996, pp. C–218 to C–226.

Wiker, Steven F. et al., "Development of Tactile Mice for Blind Access to Computers," Proc. of the Human Factors Society 35th Annual Meeting, 1991, pp. 708–712.

Akamatsu, Motoyuki et al., "Multimodal Mouse: A Mouse–Type Device with Tactile and Force Display," Presence, vol. 3, No. 1, 1994, pp. 73–80.

Ramstein, Christophe et al., "The Pantograph: A Large Workspace Haptic Device for a Multimodal Human–Computer Interaction," Computer–Human Interaction, CHI'94, 1994, pp. 1–3.

Kelley, A. J. et al., "On the Development of a Force–Feedback Mouse and it's Integration into a Graphical User Interface," 1994 Int'l Mechanical Engineering Congress and Exhib, 1994, pp. 1–8.

Kelley, A. J. et al., "Magic Mouse: Tactile and Kinesthetic Feedback in the Human–Computer Interface using an Electromagnetically Actuated Input/Output Device," University of British Columbia, 1993, pp. 1–27.

R. E. Ellis et al., "Design & Evaluation of A High–Performance Prototype Planar Haptic Interface," DSC–vol. 49, Advances in Robotics, Mechatronics, and Haptic Interfaces, ASME 1993, pp. 55–64.

Rosenberg, Louis, "A Force Feedback Programming Primer," Immersion Corp., 1997, pp. 1–176.

Hirota et al. "Development of Surface Display" 1993 Univ. of Tokyo, IEEE, 1993, pp. 256–262.

Minsky et al. "Creating an Illusion of Feel: Control Issues in Force Display" Univ. of North Carolina at Chapel Hill, 1989, pp. 1–14.

Buttolo et al., "Pen–Based Force Display for Precision Manipulation in Virtual Environments," Univ. of Washington, IEEE 0–8186–7084–3, 1995, pp. 217–224.

Kilpatrick, P.J., "The Use of a Kinesthetic Supplement in an Interactive Graphics System" Univ. of North Carolina, 1976, pp. 1–161.

Rosenberg et al., "Perceptual Decomposition of Virtual Haptic Surfaces" Proc. IEEE Symp. on Research Frontiers in Virtual Reality, 1993.

Rosenberg, L., "Virtual haptic overlays performance in telepresence tasks" Stanford Univ., Dept. of Engineering, 1994.

Rosenberg, L., "The Use of Virtual Fixtures to Enhance Operator Performance in Time Delayed Teleoperation" Wright–Patterson AFB AL/CF–TR–1194–0139, 1993, pp. 1–42.

Su, S. A. et al. "The Virtual Panel Architecture: a 3D Gesture Framework" Univ. of Maryland, IEEE 4–7803–1363–1, 1993, pp. 387–393.

Adachi et al. "Sensory Evaluation of Virtual Haptic Push–buttons" Technical Research Center, Suzuki Motor Corp., 1994.

Iwata, H., "Pen–based Haptic Virtual Environment" Univ. of Tsukuba, IEEE 0–7803–1363–1, 1993, pp. 287–292.

Minsky, M., et al. "Feeling and Seeing: Issues in Force Display," ACM 089791–351–5, 1990, pp. 235–242, 270.

Iwata, H., "Artificial Reality with Force–Feedback: Development of Desktop Virtual Space with Compact Master Manipulator," Computer Graphics, vol. 24, No. 4, 1990, pp. 165–170.

Brooks, F., et al. "Project Grope–Haptic Displays for Scientific Visualization," Computer Graphics, vol. 24, No. 4, 1990, pp. 177–185.

Yokokohji, Y., et al. "What you can see is What you can Feel—Development of a Visual/Haptic Interface to Virtual Environment," IEEE 0–8186–7295–1, 1996, pp. 46–54.

Batter & Brooks "Grope 1—A Computer Display to the Sense of Feel," Proc. IFIP Congress 1971, pp. 759–763.

Adelstein, B. et al., "Design and Implementation of a Force Reflecting Manipulandum for Manual Control Research" NASA Ames Research Center, 1992, pp. 1–26.

Russo, M., "The Design and Implementation of a Three Degree–of–Freedom Force Output Joystick," Dept. of Mech. Engineering, 1990, pp. 1–40.

Schmult, B. et al., "Application Areas for a Force–Feedback Joystick" DSC–vol. 49, Advances in Robotics, Mechatronics, and Haptic Interfaces, ASME 1993, pp. 47–54.

Atkinson, W., et al. "Computing with Feeling" Computer & Graphics, vol. 2, Pergamon Press, 1977, pp. 97–103.

Winey III, Calvin McCoy, "Computer Simulated Visual & Tactile Feedback as an Aid to Manipulator and Vehicle Control", Dept. of Mech. Engineering, MIT 1991, pp. 1–79.

* cited by examiner

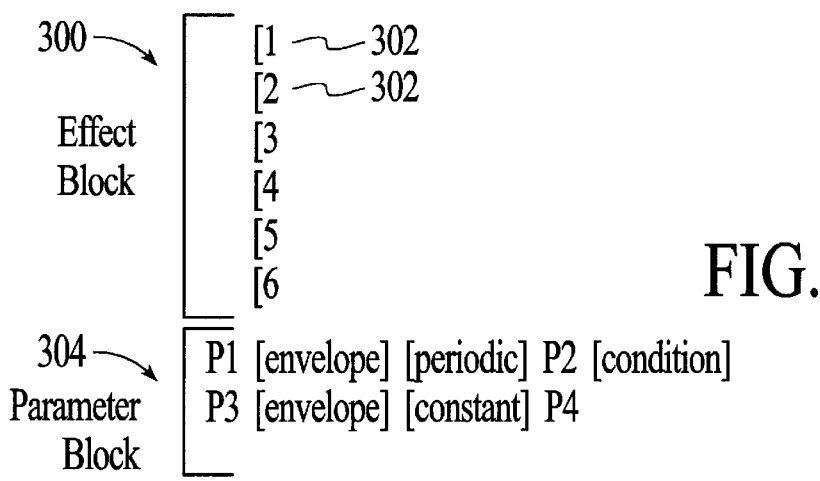

FIG. 4

| | Host | | | | Device | |
|---|---|---|---|---|---|---|
| 485 | 484 | 486 | 488 | 480 | | 482 |
| Created | | Loaded | Playing | Created | | Playing |
| 1 [Periodic 1 | | * | | 1 [Periodic 1 | | |
| 2 [Constant Force 1 | | | | 2 [Trigger Force | | |
| 3 [Damper | | * | * | 3 [Damper | | * |
| 4 [Constant Force 2 | | * | * | 4 [Constant Force 2 | | * |
| 5 [Periodic 2 | | * | | 5 [Periodic 2 | | |
| 6 [Trigger Force | | * | | | | |
| 7 [Spring 1 | | | | | | |

FIG. 9A

| | Host | | | | | Device | |
|---|---|---|---|---|---|---|---|
| 490 | | | 492 | | | | |
| Created | | Loaded | Playing | Waiting | Created | | Playing |
| 1 [Periodic 1 | | * | * | | 1 [Periodic 1 | | * |
| 2 [Constant Force 1 | | | | * | 2 [Spring 1 | | * |
| 3 [Damper | | * | * | | 3 [Damper | | * |
| 4 [Constant Force 2 | | * | * | | 4 [Constant Force 2 | | * |
| 5 [Periodic 2 | | * | * | | 5 [Periodic 2 | | * |
| 6 [Spring 1 | | * | * | | | | |
| 7 [Spring 2 | | | | | | | |

FIG. 9B

MEMORY CACHING FOR FORCE FEEDBACK EFFECTS

CROSS REFERENCE TO RELATED APPLICATIONS

This is a continuation application of copending prior Application Ser. No. 09/305,872 filed on May 5, 1999, which is a continuation-in-part of copending patent application Ser. No. 08/970,953, filed Nov. 14, 1997, the disclosures of which are incorporated herein by reference.

This invention was made with Government support under Contract No. F41624-96-C-6029, awarded by the Department of Defense. The Government has certain rights in this invention.

BACKGROUND OF THE INVENTION

The present invention relates generally to interface devices for allowing humans to interface with computer systems, and more particularly to computer interface devices that allow the user to provide input to computer systems and provide force feedback to the user.

Computer systems are used extensively to implement many applications, such as word processing, data management, simulations, games, and other tasks. A computer system typically displays a visual environment to a user on a display screen or other visual output device. Users can interact with the displayed environment to perform functions on the computer, play a game, experience a simulated environment, use a computer aided design (CAD) system, etc. One visual environment that is particularly common is a graphical user interface (GUI), and include such systems as the Windows™ operating system from Microsoft Corporation, the MacOS operating system from Apple Computer, Inc., and X-Windows for the Unix operating system. Most GUI's are currently 2-dimensional as displayed on a computer screen; however, three dimensional (3-D) GUI's with 3-D environments can also be provided. Other graphical environments include games, simulations, CAD environments, World Wide Web/Internet interfaces, etc. which present 2-D or 3-D interactive environments manipulatable by the user.

The user interaction with and manipulation of the computer environment is achieved using any of a variety of types of human-computer interface devices that are connected to the computer system controlling the displayed environment. In most systems, an application program running on the host computer updates the environment in response to the user's manipulation of a user manipulandum that is included in the interface device, such as a mouse, joystick handle, track ball, steering wheel, etc. The computer provides feedback to the user utilizing the display screen.

Force feedback interface devices allow a user to experience forces on the manipulandum based on interactions and events within the displayed graphical environment. Force feedback devices can be implemented in many forms, such as a joystick, mouse, steering wheel, etc. Typically, computer-controlled actuators are used to output forces on the user object in provided degrees of freedom to simulate various sensations, such as an obstruction force when moving a cursor into a wall, a vibration force when a virtual race car drives off a race track, or a spring force to bias a cursor to move back toward a starting position of the spring.

Force sensations are usually commanded to be output on the device by the application program running on the host computer. Most consumer-market force feedback devices include a microprocessor and memory to parse host commands and store and manage various force feedback effects local to the device. The device microprocessor can check user input and other conditions based on commands from the host, and can output force sensations using the force sensation data stored in local memory. The local management of force sensations on the device greatly increases the realism of generated force sensations due to the responsiveness of the device processing; if the host had to process all input and generate all forces, the transmission of data between host and device would cause delays in responsiveness that would seriously degrade the quality of force sensations. Thus, the ability of the device to store force sensation data and independently command those force sensations when conditions warrant is critical to realistic force feedback.

When providing force feedback sensations on a force feedback device, several issues arise as to the management of force feedback sensations. One problem is that the memory on the force feedback device is limited due to cost concerns. A device may only be able to store a certain limited number of force sensation data ("force effects") before the local memory is filled. An application program, however, may require a large number of different force effects to be output during different conditions and events in the program. For example, a racing game program may wish to output 20 different force effects for various racing conditions during a game; however, the device may only be able to store data for 10 force effects at a time.

Since data for a force effect should be stored local to the device before the force is output, the application program must first attempt to store effect data to the device. One existing way to store force effects on a device is for the host application to send a request to the device to store a specified force effect in device memory. The device determines if sufficient memory is available and responds to the host that either the requested force effect has been stored in device memory, or that the requested force effect could not be stored due to lack of sufficient space. If the effect could not be stored, the host application can send a "destroy" command to the device to remove a currently-unused force effect from device memory to free up sufficient room for the requested force effect, and then send the request again to store the new force effect. However, this method can cause some degradation in force quality on the device since the device and host must transmit data several times back and forth to free up device memory and store a new force effect.

In addition, since the device memory usually cannot store all the force effects which a host application wishes to use, the host application must spend processing time for memory management tasks. For example, the host application must determine whether to swap out an old force effect in device memory with a new force effect and then command that such a swap take place. The application must keep track of how much space is available in device memory and which force effects are currently being output. Such extra processing by the host application can degrade the overall performance of the application and compels the designer of the application to focus on low-level processing, thereby detracting from the higher-level force design process.

SUMMARY OF THE INVENTION

The present invention is directed to memory management of force effects and other management of force sensations for a force feedback system. Embodiments are disclosed which provide for efficient management of device memory and force effect output.

More specifically, the present invention provides force effects with a force feedback device having local control of the output of force sensations. A representation of device memory is created, where the device memory is provided on the force feedback device, and the representation is allocated in memory of the host computer. A force effect load command is received from an application program running on the host, where the force effect load command instructs that data for a force effect be stored in the device memory. It is then determined whether the device memory can store the force effect by examining the representation of device memory. If the device memory can store the force effect, the data for the force effect is send to the force feedback device to be stored in the device memory. The force feedback device uses the data to control a force output to a user of the force feedback device. If the device memory can store the force effect, the data for said force effect can be stored in a location of the representation of device memory, or an indication of the memory space taken by the force effect can be stored. The application program can later send a play command or a stop command, which is sent to the force feedback device to output or stop the output of force based on the loaded force effect. The total number of playing force effects loaded to the device are summed to provide the total output force on the user.

In a different aspect of the present invention, the management of storage of force effects in a force feedback system includes receiving a force effect create command by a driver running on the host computer. The command is sent from an application program running on the host computer and instructs that particular force effect data for a particular force effect be stored in memory local to the force feedback device. It is then determined whether the local memory has sufficient space to store the particular force effect data. If there is sufficient space, the particular force effect data is sent to the force feedback device to be stored in the local memory. If there is not sufficient space, the particular force effect data is stored in a cache implemented in host computer memory instead of the local memory. When a command is later received by the driver to output the cached force effect to a user of the force feedback device, the driver swaps the particular force effect data with loaded force effect data in the local memory and instructs the force feedback device to output the particular force effect.

Preferably, the driver creates a representation of the local memory in the host computer memory, and the representation can be examined for sufficient space for the force effect. Alternatively, the force feedback device can be queried and a response can be received indicating whether sufficient space is available. In addition, it can be determined whether a force effect can be loaded by comparing a priority of the particular force effect with a priority of one or more loaded force effects, where the greater priority effect can be loaded to the device memory. Priority of the loaded force effect(s) can be determined based at least partially on whether the loaded force effect is currently being output by the device, on the time period since the loaded force effect was last output by said device, and/or on whether said loaded force effect is likely to be output based on a direction of movement of a manipulation of the force feedback device in a workspace of the manipulandum of the device. The priority can also be predefined, e.g. by the application program. Furthermore, force effects can be grouped in categories to help determine which loaded force effects can be swapped with cached force effects. An apparatus for managing storage of effect using a host cache operates as described above.

In a different aspect of the present invention, forces are output from a force feedback device coupled to a host computer. A force effect play command is received from the host computer which instructs that a particular force effect be output by the force feedback device. The data for the particular force effect and data for at least one other force effect is stored in a memory local to the force feedback device. An identification of the particular force effect is designated in a playlist in local memory. When a force is to be output, the playlist is examined to determine which of the stored force effects are to be output. A force is then determined based on the force effects designated in the playlist and the force is output to a user of the force feedback device. Preferably, the output force is based on a sum of contributions from the force effects designated in the playlist. A number can be stored in local memory indicating how many the force effects stored in local memory are currently designated to be output. This allows efficient access to only the playing force effects on the device.

In yet another aspect of the present invention, force output is provided to a user of a force feedback device only at predetermined time intervals. A first force to be output by actuators of the force feedback device is determined and then output at a first point in time occurring when a predetermined time interval has passed. A second force to be output is then determined. If the predetermined time interval has not passed when the second force has been determined, then the device waits for a second time interval and outputs the second force at a second point in time. If the predetermined time interval has passed when the second force has been determined, indicating the processing of the force has taken longer than one time interval, then the device waits for a successive time interval after an integer number of the predetermined time intervals has passed, and outputs a third force at the successive point in time. The third force is appropriate to the successive point in time. For example, the first force and the second force can be at least partially based on a periodic function that varies with time, so that the third force is based on an appropriate later point of the periodic function. This allows a small time interval to be used and thus faster updating of output forces; during infrequent intervals where force processing takes longer than one time interval, the force can be output at later intervals.

The present invention provides several embodiments for managing force effect and force output in a force feedback system. A representation of the device memory is preferably maintained in host computer memory to allow the host computer to efficiently determine when effects can be loaded in device memory. Host caching of force effects allows the application program to function as if the device can store an almost unlimited number of effects, thereby freeing the application from managing low-level processing and swapping of force effects. The playlist and discrete interval force output on the force feedback device allows efficient and high fidelity output of force sensations.

These and other advantages of the different embodiments of the present invention will become apparent to those skilled in the art upon a reading of the following specification of the invention and a study of the several figures of the drawing.

BRIEF DESCRIPTION OF THE DRAWINGS

FIG. 4 is a diagrammatic illustration of an organization of device memory in the force feedback device of the system of FIG. 1;

FIGS. 9a and 9b are diagrammatic illustrations of device memory, the host representation thereof, and force effects stored in each.

DETAILED DESCRIPTION OF PREFERRED EMBODIMENTS

Figure 1:
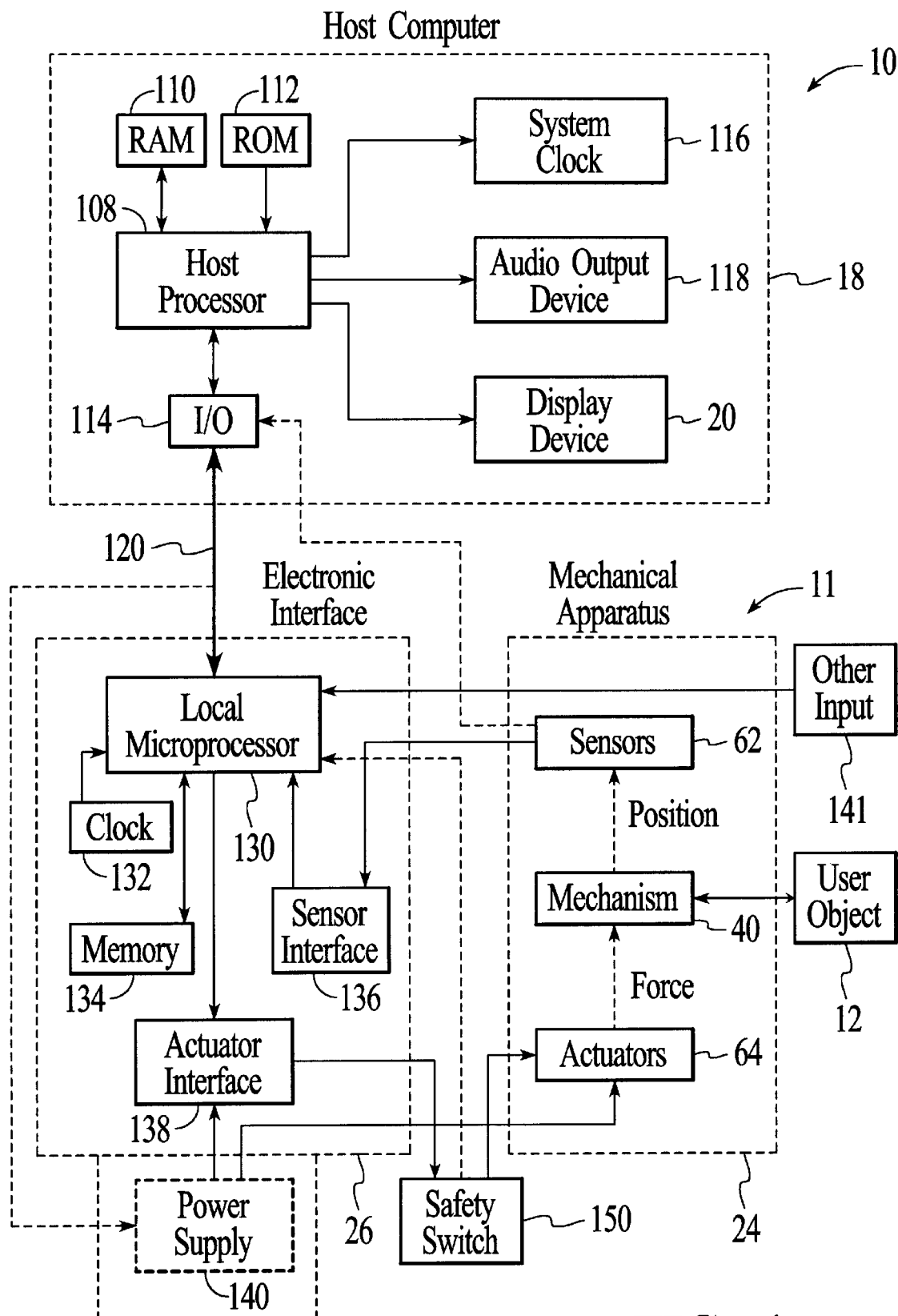
FIG. 1 is a block diagram illustrating a force feedback system suitable for use with the present invention.

FIG. 1 is a block diagram illustrating a force feedback system 10 suitable for use with the present invention. System 10 includes a host computer 18 and a force feedback interface device 11. A similar system is described in detail in patent application Ser. No. 08/970,953 and U.S. Pat. No. 5,734,373, which are incorporated herein by reference.

Host computer 18 is preferably a personal computer or workstation, such as a PC compatible computer or Macintosh personal computer, or a SUN or Silicon Graphics workstation. Alternatively, host computer system 18 can be one of a variety of home video game systems commonly connected to a television set, such as console systems available from Nintendo, Sega, or Sony. In other embodiments, host computer system 18 can be a "set top box" which can be used, for example, to provide interactive television functions to users, or a "network-" or "internet-computer" which allows users to interact with a local or global network using standard connections and protocols such as used for the Internet and World Wide Web.

Host computer 18 commonly includes a host microprocessor 108, random access memory (RAM) 110, read-only memory (ROM) 112, input/output (I/O) electronics 114, a clock 116, a display device 20, an audio output device 118. Host microprocessor 108 can include a variety of available microprocessors from Intel, AMD, Motorola, or other manufacturers. Microprocessor 108 preferably retrieves and stores instructions and other necessary data from RAM 110 and ROM 112 as is well known to those skilled in the art. In the described embodiment, host computer 18 can receive sensor data or a sensor signal via a bus 120 from sensors of device 11 and other information. Microprocessor 108 can receive data from bus 120 using I/O electronics 114, and can use the I/O electronics, bus 120, and/or other buses to control other peripheral devices, such as disk drives, hard drives, CDROM, DVDROM, non-volatile memory etc. Host computer 18 can also output commands to interface device 11 via bus 120 to cause force feedback for the system 10.

Computer 18 can operate under the Windows™, MacOS, Unix, or other operating systems, or other software. Host computer 18 preferably implements one or more application programs ("applications") with which a user is interacting via mouse 12 and other peripherals, if appropriate, and which can include force feedback functionality. For example, the host applications can include a simulation, video game, Web page or browser that implements HTML or VRML instructions, word processor, drawing program, spreadsheet, scientific analysis program, or other application program that utilizes user input from device 11 and outputs force feedback commands to the device 11. In the preferred embodiment, multiple applications can run simultaneously in a multitasking environment of the host computer. Herein, computer 18 may be referred as displaying "graphical objects" or "computer objects." These objects are not physical objects, but are logical software unit collections of data and/or procedures that may be displayed as images by computer 18 on display screen 20, as is well known to those skilled in the art. A displayed cursor or a simulated cockpit of an aircraft might be considered a graphical object. Suitable software drivers which interface such applications with computer input/output (I/O) devices are available from Immersion Corporation of San Jose, Calif.

Display device 20 can be included in host computer 18 and can be a standard display screen (LCD, CRT, etc.), 3-D goggles, or any other visual output device. Typically, the host application provides images to be displayed on display device 20. For example, display screen 20 can display images from a GUI, from a moving, first person point of view in a virtual reality game, a third-person perspective of objects, backgrounds, a simulation (such as a medical simulation), etc.

Clock 116 is a standard clock crystal or equivalent component used by host computer 18 to provide timing to electrical signals used by host microprocessor 108 and other components of the computer 18. Audio output device 118, such as speakers, can be coupled to host microprocessor 18 via amplifiers, filters, and other circuitry well known to those skilled in the art. Host processor 108 outputs signals to speakers 118 to provide sound output to the user when an "audio event" occurs during the implementation of the host application program. Other types of peripherals can also be coupled to host processor 108, such as storage devices (hard disk drive, CD ROM drive, floppy disk drive, etc.), printers, and other input and output devices.

Force feedback device 11 is coupled to host computer system 18 by a bi-directional bus 120. The bi-directional bus sends data in either direction between host computer system 18 and the interface device 11. Bus 120 can be a serial interface bus providing data according to a serial communication protocol, a parallel bus using a parallel protocol, or other types of buses. An interface port of host computer system 18, such as a USB or RS232 serial interface port, connects bus 120 to host computer system 18. Alternatively, Firewire (also called IEEE 1394) can be used as bus 120; or, the bus can be between an interface card in the host computer 18, where the interface card holds components of device 11 such as microprocessor 130. In other embodiments, signals can be sent between interface 14 and computer 18 by wireless transmission/reception.

Force feedback device 11 includes an electronic interface 26, a mechanical portion 24, and a manipulandum or "user object" 12. Electronic interface 26, mechanical portion 24, and user object 12 can also collectively be considered the force feedback device 11.

The electronic portion 26 of interface 14 may couple the mechanical portion 24 of the interface of the host computer 18. The electronic portion 26 is preferably included within a housing of the device 11 or, alternatively, the electronic portion may be included in host computer 18 or as a separate unit with its own housing. Electronic interface 26 includes a local microprocessor 130, local clock 132, local memory 134, sensor interface 136, and actuator interface 138. Interface 26 may also include additional electronic components for communicating via standard protocols on bus 120. In various embodiments, electronic interface 26 or components thereof can be included in mechanical portion 24, in host computer 18, or in its own separate housing.

In a local control embodiment that utilizes microprocessor 130, host computer 18 provides high level supervisory commands to microprocessor 130 over bus 120, and microprocessor 130 manages low level force control loops to sensors and actuators in accordance with the high level commands and independently of the host computer 18. The microprocessor 130 can process inputted sensor signals to determine appropriate output actuator signals by following the instructions of a "force process" that may be stored in local memory and includes calculation instructions, formulas, force magnitudes, or other data. The force process can command distinct force sensations, such as vibrations, textures, jolts, or even simulated interactions between displayed objects. The microprocessor can be provided with the necessary instructions or data to check sensor readings, determine graphical object positions, and determine output forces independently of host computer 18. The host can implement program functions (such as displaying images) when appropriate, and synchronization commands can be communicated between the microprocessor and host 18 to correlate the microprocessor and host processes. Sensor signals (and/or processed sensor signals) received and used by microprocessor 130 are also reported to host computer system 18, which updates the host application program. Such commands and related functionality is discussed in greater detail in U.S. Pat. No. 5,734,373. The host can send the local processor a spatial layout of objects in the graphical environment to store in local memory 134 so that the microprocessor has a mapping of locations of graphical objects like enclosures and can determine interactions with the cursor locally. Alternatively, the computer 18 can directly send force feedback signals to the microprocessor 130 to be directly output to actuators and provide forces on user object 12. Force feedback used in graphical environments is described in greater detail in U.S. Pat. Nos. 5,825,308; 6,219,032; and 6,252,579, all of which are incorporated by reference herein. In a different embodiment, host computer 18 can provide low-level force commands over bus 120, which microprocessor 130 directly transmits to the actuators.

In a local control embodiment that utilizes microprocessor 130, host computer 18 provides high level supervisory commands to microprocessor 130 over bus 120, and microprocessor 130 manages low level force control loops to sensors and actuators in accordance with the high level commands and independently of the host computer 18. The microprocessor 130 can process inputted sensor signals to determine appropriate output actuator signals by following the instructions of a "force process" that may be stored in local memory and includes calculation instructions, formulas, force magnitudes, or other data. The force process can command distinct force sensations, such as vibrations, textures, jolts, or even simulated interactions between displayed objects. The microprocessor can be provided with the necessary instructions or data to check sensor readings, determine graphical object positions, and determine output forces independently of host computer 18. The host can implement program functions (such as displaying images) when appropriate, and synchronization commands can be communicated between the microprocessor and host 18 to correlate the microprocessor and host processes. Sensor signals (and/or processed sensor signals) received and used by microprocessor 130 are also reported to host computer system 18, which updates the host application program. Such commands and related functionality is discussed in greater detail in U.S. Pat. No. 5,734,373. The host can send the local processor a spatial layout of objects in the graphical environment to store in local memory 134 so that the microprocessor has a mapping of locations of graphical objects like enclosures and can determine interactions with the cursor locally. Alternatively, the computer 18 can directly send force feedback signals to the microprocessor 130 to be directly output to actuators and provide forces on user object 12. Force feedback used in graphical environments is described in greater detail in co-pending patent application Ser. Nos. 08/571,606, and 08/924,462, and U.S. Pat. No. 5,825,308, all of which are incorporated by reference herein. In a different embodiment, host computer 18 can provide low-level force commands over bus 120, which microprocessor 130 directly transmits to the actuators.

A local clock 132 can be coupled to the microprocessor 130 to provide timing data, similar to system clock 116 of host computer 18; the timing data might be required, for example, to compute forces output by actuators 64 (e.g., forces dependent on calculated velocities, accelerations, or other time dependent factors). In alternate embodiments using the USB communication interface or other bus having a synchronization signal, timing data for microprocessor 130 can be retrieved from the USB interface.

Local memory 134, such as RAM and/or ROM, is preferably coupled to microprocessor 130 in interface 26 to store force sensations ("force effects"), other instructions for microprocessor 130, and store temporary and other data. Microprocessor 130 may also store calibration parameters in a local memory 134. Memory 134 may also be used to store the state of the force feedback device, including a reference position, current control mode or configuration, etc. Memory management techniques of the present invention for local memory 34 are described in greater detail below.

Sensor interface 136 may optionally be included in electronic interface 26 to convert sensor signals to signals that can be interpreted by the microprocessor 130 and/or host computer system 18. Such circuits, or equivalent circuits, are well known to those skilled in the art. Alternately, microprocessor 130 or host 18 can perform these interface functions. Actuator interface 138 can be optionally connected between the actuators 64 and microprocessor 130 to convert signals from microprocessor 130 into signals appropriate to drive the actuators. Interface 138 can include power amplifiers, switches, digital to analog controllers (DACs), and other components as well known to those skilled in the art. In alternate embodiments, interface 138 circuitry can be provided within microprocessor 130 or in the actuators. Power supply 140 can be used to supply power to the actuators 64 and other components. Power can also be supplied by the host computer over USB 120.

Mechanical portion 24 is coupled to electronic portion 26 and preferably includes sensors 62, actuators 64, and mechanism 40. Sensors 62 sense the position, motion, and/or other characteristics of manipulation 12 along one or more degrees of freedom and provide signals to microprocessor 130 including information representative of those characteristics. A sensor 62 is provided for each degree of freedom of the manipulandum 12, or, a single compound sensor can be used for multiple degrees of freedom. Example of sensors suitable for embodiments described herein are rotary optical encoders, as described above, linear optical encoders, analog sensors such as potentiometers, or non-contact sensors, such as Hall effect magnetic sensors or an optical sensor such as a lateral effect photo diode having an emitter/detector pair. In addition, velocity sensors (e.g., tachometers) and/or acceleration sensors (e.g., accelerometers) for measuring acceleration can be used. Furthermore, either relative or absolute sensors can be employed.

Actuators 64 transmit forces to user object 12 in one or more directions along one or more degrees of freedom in response to signals output by microprocessor 130 and/or host computer 18, i.e., they are "computer controlled." Typically, an actuator 64 is provided for each degree of freedom along which forces are desired to be transmitted. Actuators 64 can be electromagnetic actuators such as DC motors, or can be other active actuators, such as linear current control motors, stepper motors, pneumatic/hydraulic active actuators, a torquer (motor with limited angular range), voice coil motors; or passive actuators such as magnetic particle brakes, friction brakes, or pneumatic/hydraulic passive actuators, passive damper elements, an electrorheological fluid actuator, a magnetorheological fluid actuator. In some embodiments, all or some of sensors 62 and actuators 64 can be included together as a sensor/actuator pair transducer.

Mechanism 40 can any of several types of mechanisms. For example, mechanisms disclosed in U.S. Pat. Nos. 5,623,582, 5,731,804, 5,767,839, 5,721,566, 5,805,140, 5,691,898, 6,028,593, 6,024,576, and 5,828,197, all incorporated herein by reference, can be included.

User object 12 is a physical object that is preferably grasped or gripped and manipulated by a user. By "grasp," it is meant that users may physically engage a portion of the object in some fashion, such as by hand, with their fingertips, etc. A great number of types of user manipulable objects can be used with the method and apparatus of the present invention. For example, such objects may include a mouse, sphere, a puck, a joystick, cubical- or other-shaped hand grips, a fingertip receptable for receiving a finger or a stylus, a flat planar surface like a plastic card having a rubberized, contoured, and/or bumpy surface, a gamepad, a steering wheel, a pool cue, a handheld remote control used for controlling web pages or other devices, or other objects.

Other input devices 141 can optionally be included in system 10 and send input signals to microprocessor 130 and/or host computer 18. Such input devices can include buttons, switches, dials, knobs, or other controls used to supplement the input from the user to an application program. Also, voice recognition hardware (with software implemented by host 18), or other input mechanisms can be used. Safety or "deadman" switch 150 is preferably included in interface device to provide a mechanism to allow a user to deactivate actuators 64 for safety reasons. The user must continually close safety switch 150 during manipulation of user object to enable the actuators 64. A capacitive contact sensor, mechanical switch, electrostatic contact switch, or optical switch, z-axis force sensor, piezo electric sensor, force sensitive resistor, a strain gauge, or a hand weight safety switch can be used to sense the presence of the user's contact with the user object.

Host Computer Force Feedback Architecture

The host computer 18 interacts with interface device 11, in the present invention, using a number of different levels of controllers. These controllers are preferably implemented in software, e.g. program instructions or code, and such is the embodiment described herein; however, all or pat of the controllers may also be implemented in hardware, where the conversion of functionality of the software to hardware is well known to those skilled in the art. The architecture described herein is oriented towards providing force feedback functionality for a system including a host computer connected to a force feedback interface device, where the interface device stores force information from the host and receives commands from the host to implement forces based on the stored information. The described architecture is most applicable to a computer such as a PC, Macintosh, workstation, etc., and is not as applicable to other host computers such as console game systems. However, such other systems often include the equivalent to many of the described control levels. For example, a game program on a console can be considered an application and a library on the console that is accessed by function calls from the game program can be the equivalent of the API and/or translation layers.

Figure 2:
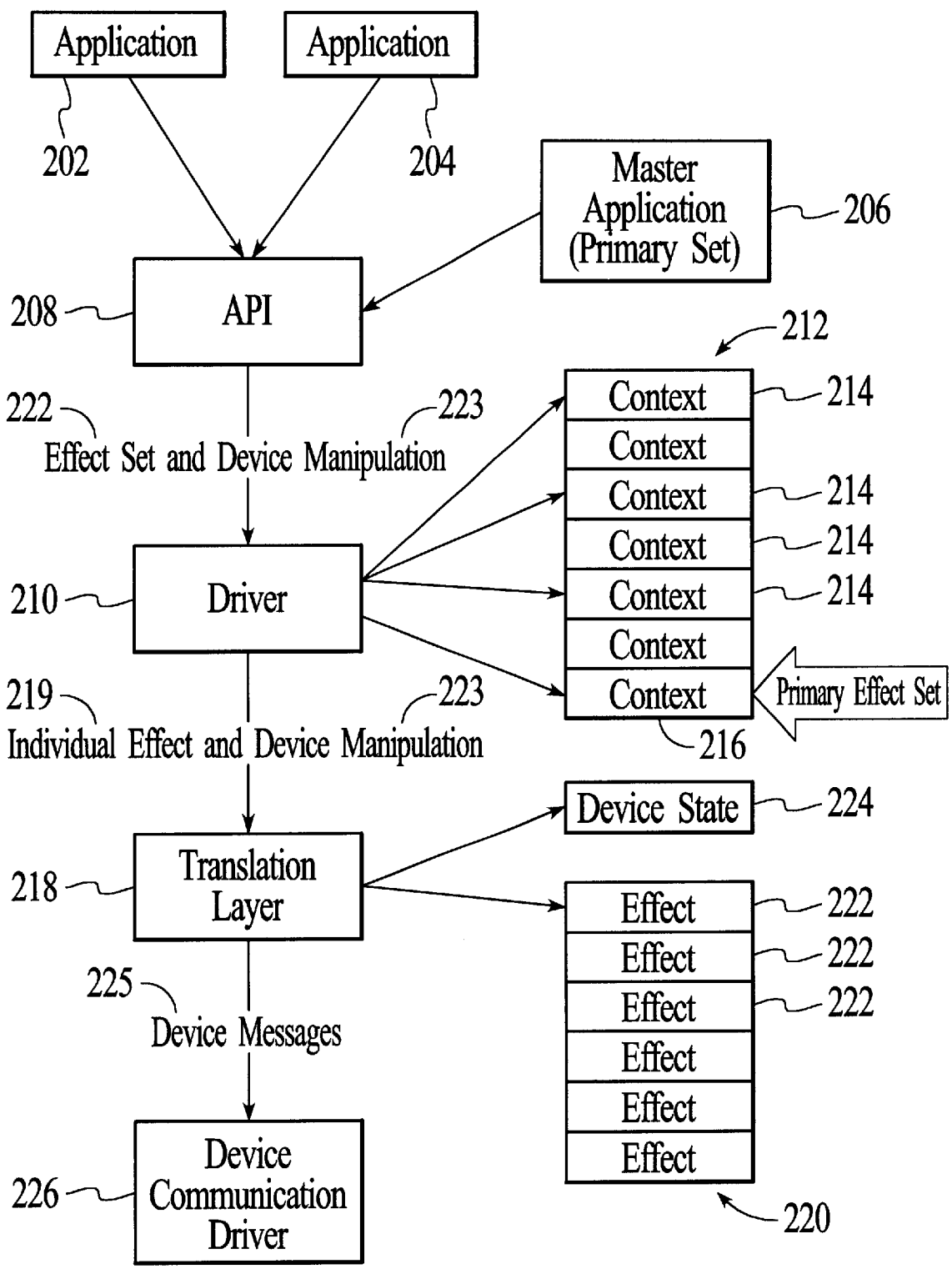
FIG. 2 is a block diagram illustrating a hierarchy of programs running on the host computer in the force feedback system of FIG. 1.

FIG. 2 is a block diagram of a preferred architecture for the host computer to communicate with and control a force feedback interface device 11. One or more application programs 202 and 204 can be running on the host computer 18 (concurrently, if more than one application is running). If more than one application is running, one of the application programs is actively running in an operating system as the "active" application program (also known as the application program that is "in focus" or which has "keyboard focus"). In a GUI, the active window is typically the topmost displayed window in which input is provided by the user using the mouse-controlled cursor, a keyboard, or other peripheral. The other applications are "inactive" in that they are not receiving input from the user (although they may have a window displayed in the GUI which can be updated on the screen). The inactive applications may also receive input or send output from other sources, such as peripherals. For example, the Windows™ operating system from Microsoft Corp. provides a multitasking or pseudo-multitasking environment in which programs run simultaneously; other operating systems such as Unix also offer multitasking. For example, a word processor may be the active application to receive input from the keyboard and display input characters in a displayed active window on display screen 20, while a inactive communication program may be receiving data over a network and saving the data on a storage device, or sending data out to be printed. When the user moves the cursor over an inactive window and provides a command gesture such as clicking a button on a mouse, the inactive window becomes the active window and the former active window becomes inactive. Alternatively, the active application program may take control of the entire screen; for example, an active game program may display its environment exclusively on a full screen rather than in a window of the GUI. The active and inactive applications are also known as "foreground" applications, as opposed to the background application described below.

A master application 206 may also be running on host computer 18 and is referred to as the "background" force feedback application. This application is preferably a general purpose program that always runs inactively in the operating system and whose set of commanded forces are always available to be output and controlled on the interface device 11 and/or other devices. An example interface window for master application is a "desktop" control panel for force feedback, described in greater detail in the patent application Ser. No. 08/970,953. The types of forces possible to be output by the device are described in greater detail in U.S. Pat. No. 5,734,373, 6,020,876, and 6,169,540, all incorporated by reference herein.

The force sensations specified by the background application will be output by the force feedback device by default, unless a different foreground application program deactivates the force sensations or replaces a force sensation with its own. For example, a background-specified snap force is preferably applied to all menus of all running application programs in the GUI, since it is a background force effect. If the foreground active application program has its own force sensations which define that application's menus to have a jolt instead of a snap, then the jolt will be superimposed on the snap unless the active application program deactivates the background forces(s). In general, a particular active application program can only command forces to objects of its own, e.g., that application's own menus, windows, scrollbars, icons, window borders, etc.

A user can specify multiple background force sensations for each graphical object. This allows the multiple force sensations to be superimposed on each other, unless the application program overrides one or more of the superimposed forces. Thus, a user can assign a damper force sensation and a "ticks" force sensation to scrollbars, and all scrollbars will have these forces associated with them unless overridden by the foreground application program. Other controls in the background application can include a device gain to set the percentage of maximum magnitude for all the forces of the background application.

Application programs 202, 204, and 206 communicate with a force feedback Application Programming Interface ("API") 208 which is resident in the host computer's memory and which allows a given application program to communicate with lower level drivers and other force feedback functions. For example, in the Windows operating system, API's are commonly used to allow a developer of an application program to call functions at a high level for use with the application program, and not worry about the low level details of actually implementing the function.

The API of the present invention includes a set of software "objects" that can be called to command a force feedback interface device 11. Objects are a set of instructions and/or data which can be called by a pointer and/or an identifier and parameters to implement a specified function. For example, three types of objects are provided in one preferred API implementation interface objects, device objects, and effect objects. Each of these objects makes use of one or more force feedback device drivers which are implemented as objects in the API 208.

Interface objects represent the API at the highest level. An application program (which is referred to as a "client" of the API) can create an interface object to access lower level objects and code that implement force feedback device functionality. For example, the interface object allows an application program to enumerate and receive information about individual devices and create lower level objects for each device used by the application program.

Device objects each represent a physical force feedback device (or other compatible device or peripheral) in communication with the host computer 18. For example, the force feedback device 11 would be represented as a single device object. The device objects access the set of force feedback routines to receive information about an associated physical device, set the properties of the physical device, register event handles (if events are implemented on the host), and to create effect objects.

Effect objects each represent a force feedback effect defined by the application program to be output one or more times to the user using a force feedback device. The effect objects access the set of force feedback routines to download force effects to the force feedback device, start and stop the output of force effects by the force feedback device, and modify the parameters of the effects.

A "force effect," as referred to herein, is a definition for a force or series of forces that may be commanded within the API. The force effect typically has a name (identifier) to identify it and one or more parameters to characterize the force effect as desired. For example, several types of force effects have been defined, including vibrations, enclosures, grids, textures, walls, dampers, snap sensations, vibrations, circles, ellipses, etc. For example, a vibration force effect may have parameters of duration, frequency, magnitude, and direction. The force sensations output to the user can be derived from one or more force effects (e.g. force effects can be superimposed on each other). Force effects, in turn, are made up of one or more basic force prototypes, such as springs, dampers, and vector forces.

In some embodiments, an application program client interacts with the API 206 by first receiving a pointer to a resident force feedback interface; for example, a preferred interface includes procedures specified by the Component Object Model (COM) of Microsoft Windows, an object oriented model for constructing interfaces (embodiments in which host computer 18 is a console game system, for example, may use other software architectures). Using the force feedback interface, the application program enumerates the force feedback devices on the computer system 18. The application program selects a desired one of the force feedback devices and creates a device object associated with that device. Using the force feedback interface, the application then acquires the device, sets the device up with setup and default parameters, and creates effect objects and event objects during the execution of the application program at times designated by the developer of the application. At appropriate times, the application program will command the creation/destruction of force effect and the start, stop, or, pause of the playback of force effects by accessing the appropriate interface instructions associated with the desired effect. If appropriate (see below), the API can indicate to a context driver 210 to create a "context" (i.e. "effect set") for an application program, and sends effects and events to be associated with the context. A "contex" is a group or set of effects and events that are associated with a particular application program.

In embodiments allowing multiple application programs to be simultaneously running on the host, each application program may have its own set of force sensations to output to the force feedback device. Since the device cannot implement all force sensations at any one time due to cost and hardware constraints, the forces commanded by each application must be organized by the architecture to take these limitations into account.

Context driver 210 is used to implement force effects for multiple application programs. Context driver 210 receives contexts 222 and device manipulation data 223 from the API 208. The context driver is provided at a level below the API to organize contexts for applications 202 and 204 running on the host computer. In the preferred embodiment, the effects and events in a context are not known to the application program itself; rather, the context driver 210 creates a context internally for an application. Thus, an application commands that a particular force sensation be output in response to different interactions or occurrences, e.g., an interaction of a cursor with an object or region, or the output of a force based on other criteria (time, received data, random event, etc.). The API sends the commanded effect(s) to the context driver 210, and the context driver stores the effects in the context created for that application program.

Since each application may have a completely different set of force effects to output, each context must be associated with its particular application program. In the preferred embodiment, there are two types of contexts: foreground contexts and background contexts. One foreground context is associated with the application program 202 or 204 that is currently active in the operating system. Different foreground contexts can include the effects and events for inactive application programs. A background (primary) context includes effects for the master application program 206. In addition, a "global context" can be provided, which includes common effects almost always used by application programs (e.g. a pop force) and which can automatically be downloaded to the force feedback device. Effects in the global context need not be stored in individual contexts for particular application programs.

When an application program is first executed by the host computer and loaded into memory, if the application is able to command a force feedback device, the application will query for the API 208. Once communication is established, the API will contact the context driver 210 to create an entry location for a context set for the initiated application program.

The context driver 210 receives individual effects and events as they are created by the application program using API 208 and stores the effects and events in a context list 212, storing each context in a different storage location in the host's memory or on some other type of storage device. An active or inactive application program can create a context and have it stored, but only the active application's context will be sent to the force feedback device. The context driver 210 can examine an identifier in a created effect or event to determine which application program is associated with it and thus store the effect or event in the proper memory location. The context driver sets pointers to the contexts and to the effects and events in the contexts to access them. An effect can be created initially when the application program is first executed, before any forces are commanded, or the effect can be later created during application execution and then immediately commanded to be played by the force feedback device. Each context also preferably includes an entry into a device state structure. This entry governs the "gain" or force level for all effects in the context. For example, all the forces in the context can be cut to 50% of full magnitude by storing a value of 50 in the device state structure. One of the contexts stored in list 214 is a primary context 216, which is the list of effects and events used by the master application 206 or "background" application.

At a later time, after the context driver has stored the contexts in list 212, an application program may send a command to the API to output or "play" a particular force sensation. The API checks whether the application program is active or in the background (primary); if not, the API does not send any data to the device and/or to the lower drivers. Alternatively, the commands from an inactive foreground application can be stored and then sent to the device when the application becomes active. If the application is active or background, the API sends the start information to the context driver 210 indicating the application program that commanded the force and the particular force effects to be commanded. The context driver 210 then associates the commanding application program with a context 214 in list 212 and sends the effects from the context to the force feedback device (if not previously sent). For example, if a context for a particular application program includes a spring effect, a damper effect, and a vibration effect, and the application program commands the vibration to be output, then the context driver selects the vibration effects to be output to the device. The data describing this effect is then output by the context driver 210. Similarly, the application program can send a command to stop particular force effects, to pause the effects, to get the status information of an effect, or to destroy an effect. Some of these commands are described in greater detail below. Thus, the application program believes it is the only one using the force feedback device when in actuality the context driver uses one particular set of multiple sets of force effects based on the active application. In effect, there is a virtual force feedback device dedicated to each running application program.

A context is therefore only allowed to exert forces with the force feedback device when that context is active, i.e., is associated with an active application program or the background application. In the described embodiment, only one foreground context can be active at any given time. Any number of background contexts may be simultaneously active; however, there may be a device limit on the number of background contexts that may be created. For example, the device 11 may only allow one background context to be created at any one time, which is the preferred embodiment. Thus, if an inactive (not in focus) foreground application program commands a force to be output, the API will ignore the command after determining that the commanding application is not active (or, the command will only be sent to the device when that application becomes active).

If the active application program becomes inactive (or is removed from the host's memory) and a different application becomes active, then the API indicates this to the context driver 210, which then deactivates the context associated with that application program and loads the effects from the new active context to the force feedback device 11. Likewise, when the original application program again becomes active, the API tells the context driver to activate the associated context and load the appropriate effects to the force feedback device.

Device manipulation data 223 is also received by context driver 210. Data 223 is used to set a global device state on the force feedback device, as described below, and this information is passed unmodified to the translation layer.

Some embodiments may not allow multiple simultaneous application programs to each command forces; there is only one active application that uses the device 11. For example, in such an implementation, a force feedback game might be running on the host, and no other application programs can be allowed to command forces to the device 11. Such an implementation does not require the context driver 210 to operate; commands from the API can be passed directly to the translation layer 218, described below. The translation layer would access a single context list 220 in such a case, i.e., there would be no need to provide multiple contexts 214.

Translation layer 218 manages the sending of effects to the device 11, receives information from the device to the host (in some embodiments), and maintains a representation or model of the memory of device 11. Translation layer 218 receives an individual effect 219 for the active (or background) application program and device manipulation data 223 sent by the context driver 210 (or from the API 208 if no context driver 210 is used). The translation layer provides the effect from a context list 220 of individual effects 222 (list 220 represents a context 214). A different context list 220 is provided in each context 214 of list 212. Each effect 222 in list 220 defines a force or series of forces that is to be output on the user object 12 by the force feedback device 11. When the effects are to be loaded on the device 11 ("created") by the application, they are selected and copies are output to the device by the translation layer. Preferably, each effect is output by the translation layer as soon as it is received by the layer 218. Each effect stored in list 220 as examined by the translation layer is available on force feedback device 11, i.e., the local microprocessor 130 should recognize the effect and be able to output the effect immediately or when conditions dictate.

In a multiple-application system, when an active application becomes inactive, the translation layer is instructed by the context driver 210 to "unload" the effects of the context of the previous active application from the force feedback device (e.g., designate the memory space for those effects as free), receives the effects from the now active application and loads those effects to the force feedback device 11 (the effects for the background (primary) application are preferably never unloaded).

The translation layer also preferably handles events. For example, when a screen position is received from the device 11, the translation layer can check whether any of the conditions/triggers of the active events are met. If so, a message is sent which eventually reaches the associated active or background application program. In alternate embodiments, the microprocessor 130 on device 11 can check for events and send event notifications through translation layer 218 up to the application program.

The translation layer also can store a device state 224 in memory. Device manipulation data 223 from the active application and the background application determines the device state. This is the state that the active application program wishes to impose on the device, if any. For example, an overall condition can be stored, such as an enable or disable for all forces, so that if all forces are disabled, no forces will be output by the device. An overall gain can also be set to limit all output force magnitudes to a desired level or percentage of maximum output.

The translation layer outputs device messages 225 (commands) to the device 11 by way of the next layer. Messages may include force effects to be output and/or any other information such as device identification numbers or instructions from the context driver for an effect (start, stop, pause, reset, etc.) The translation layer outputs messages 225 to the device driver 226.

Device communication driver 226 communicates directly with the force feedback device. Driver 226 receives the device messages 225 from translation layer 218 and directly transmits the messages to the force feedback device over bus 120, e.g. a USB, in a form the device 11 can understand. The driver 226 is implemented, in the preferred embodiment, as a standard device driver to communicate over such a serial port of host computer 18. Other types of drivers and communication interfaces can be used in other embodiments.

Memory Management of Force Effects

Figure 3:
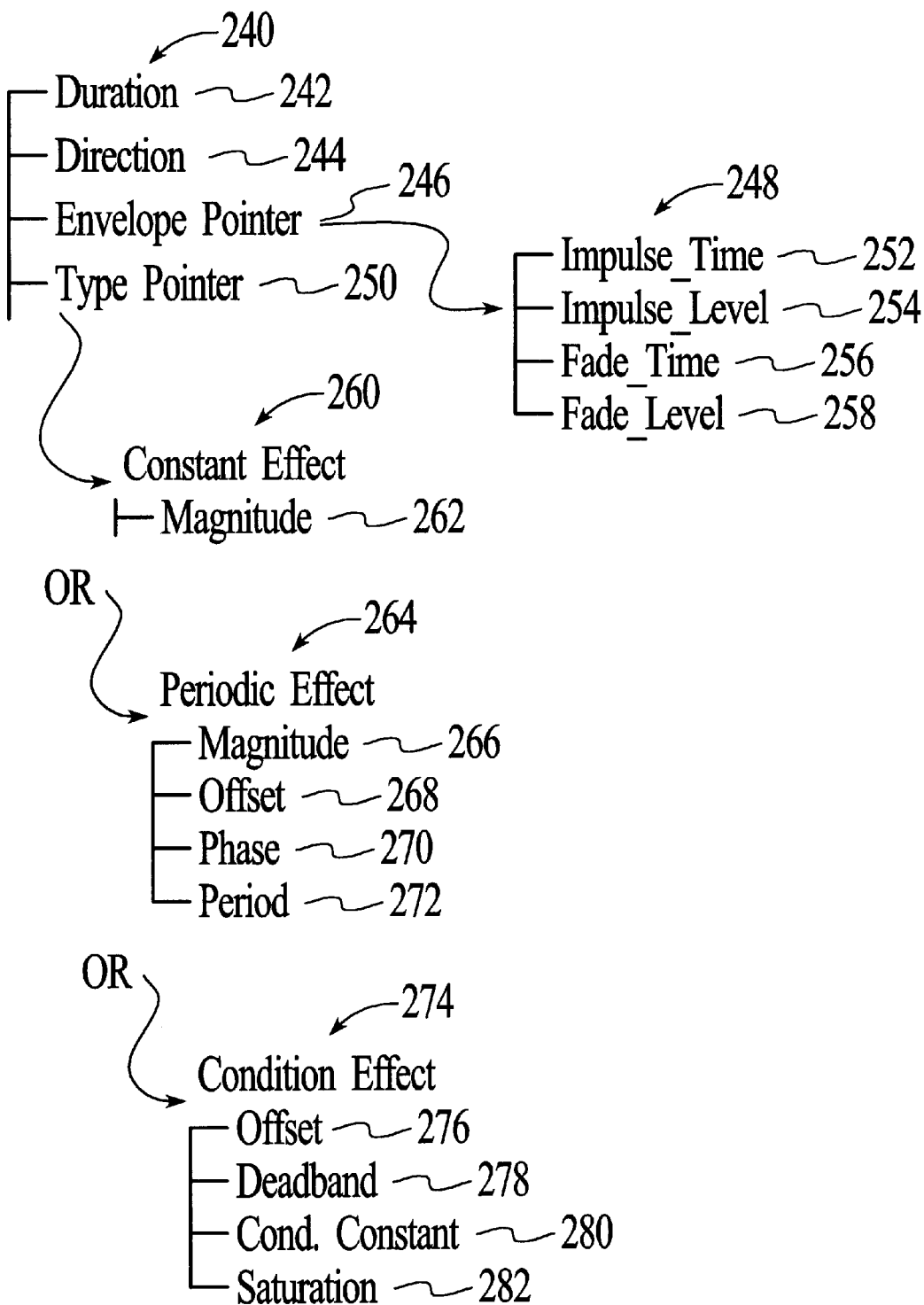
FIG. 3 is a diagrammatic illustration of an example force effect structure which can be used in the present invention.

FIG. 3 illustrates an example data structure for a force effect. An important aspect of the present invention is that a model of representation of the memory 134 on device 11 is maintained by the translation layer (or API or other driver) on the host computer 18. Thus, the translation layer knows exactly when an effect can be downloaded to and stored by the device 11 and when there is not sufficient memory on the device to store a particular effect. The size of the effect list 220 on the host computer should be the same as (or smaller than) the available memory for such a list in the force feedback device so that the translation layer knows when the memory of the force feedback device is full. If the memory 134 is full, the translation layer can delay the output of additional effects until enough memory space is available (e.g. see effect caching with regard to FIG. 7), or can simply discard the effect.

Example data structure 240 may include several fields, such as duration 242 indicating the amount of time the force effect is to be played, direction 244 indicating the direction in one or more degrees of freedom the force is applied, an envelope pointer 246 pointing to an envelope data structure 248, and a type pointer 250 pointing to a type data structure. The duration 242 and direction 244 fields can simply store one or more values associated with those characteristics. The envelope data structure 248 can either be null if the force effect does not use an envelope (e.g. a condition force), or the data structure 248 can hold several values that define an "envelope" for a periodic wave, such as impulse time 252, impulse level 254, fade time 256, and fade level 258. Shaping of waves using such parameters is described in greater detail in U.S. Pat. No. 5,959,613, incorporated by reference herein. Type pointer 250 can point to one of multiple possible different data structures, depending on the type of force effect. For example, if it is a constant force effect, data structure 260 is pointed to, having a magnitude parameter 262 (which can be signed). If it is a periodic effect, data structure 264 is referenced, having values of magnitude 266, offset 268, phase 270, and period 272 that define the periodic effect. If it is a condition effect, such as a spring or damper, then data structure 274 is referenced, having offset 276, deadband 278, constant 280 (e.g., spring constant or damping constant), and saturation 282 values.

As exemplified by FIG. 3, different force effects have different storage requirements. Some force effects may not need to store envelope data from structure 248, while some periodic and constant effects may require additional space to store the envelope information. Condition force effects require a different amount of memory space for data in structure 274 than do constant force effects for data in structure 260. Since a model of the device memory is maintained on the host computer, the host knows how much memory is available on the device, i.e., when a particular effect can be stored by the device and when an effect cannot be stored.

FIG. 4 illustrates another example of a layout of device memory 134 provided in device 11 which is modeled on the host computer. An effect memory block 300 can be allocated in memory (both host and device memory) for storing data relating to the identification of distinct force effects. Each force effect stored in effect block 300 has the same size. For example, in FIG. 4 the device 11 can store six force effects in block 300, one effect in each effect space 302 of an array. Each effect space 302 holds a pointer to the particular parameters defining that force effect. The parameters can be stored in a parameter block 304 of the memory 134. Since the parameters can differ in amount and in size for different force effects, there is no constant amount of memory space in the parameter block allocated for each force effect. Rather, the amount of space (e.g. the offsets into the memory) that each set of parameters occupies must be tracked so that additional parameters can be stored around existing parameters, and so that it is known when the memory is full. Furthermore, the parameter block 304 is used to store working values used during playback of a force effect; thus, additional space is often needed beyond what is required simply to store the parameters. In other embodiments, the effect block and parameter block may be combined as a single block of memory, similar to the embodiment for a single context 220 shown in FIG. 2. For example, parameters for an effect can be stored directly after the identifying information.

As explained above, the translation layer on the host computer preferably maintains a model of the device memory 134 to determine where to store parameters and to determine when the memory is full. Initially, such as at power up of the device 11, the host preferably asks the device for any relevant information to model the memory, such as the size of the available effect and parameters blocks, as well as the number of effects that can be stored in effect block 300 (which can varying depending on the device 11). Some devices 11 may be able to inform the host how much space must be allocated for each effect slot 302, parameters for an effect, and/or how to specify the usage of parameter pointers.

Figure 5:
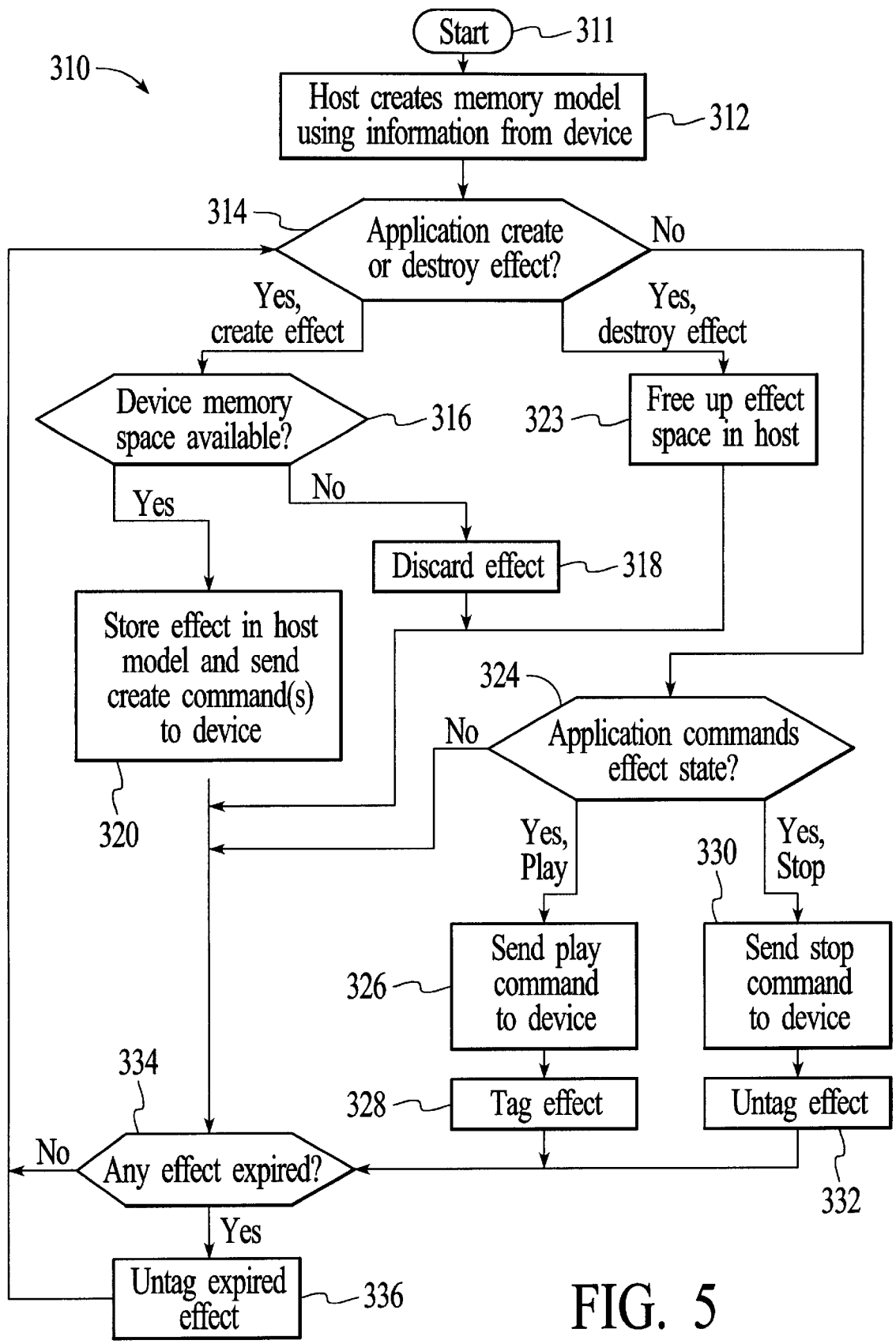
FIG. 5 is a flow diagram illustrating a method of the present invention for host management of force effects using a host representation of device memory.

FIG. 5 is a flow diagram illustrating a basic memory management process 310 for use with a single application program and a force feedback device. This process is described from the point of view of a lower-level program on the host (generically called a "driver" herein), such as the translation layer, the API, a library (e.g., library functions and procedures), or another driver, but may be implemented at other levels of the host architecture in other embodiments. Process 310 may be used whether the application program is the only application program, or if the program is one of multiple programs concurrently running on the host. It should be noted that the order of steps described below is only provided for explanatory purposes, and that the various steps, checks and events can occur in different sequences or in parallel (multitasking) in various embodiments. For example, many of the checks can be implemented as function calls or interrupts, where associated steps can simply be processed when called regardless of any current stages of other processes.

The process 310 begins at 311. In step 312, the host 18 creates a memory model using information from the device 11. For example, a context 220 can be created as explained above with reference to FIG. 2. The model used in FIG. 4 can be used; this model is referred to in the following discussion. As explained above, the device can send the host 18 information such as the size of memory and number of effects that can be stored.

In step 314, the process determines whether the application program (e.g. by a function call to the API or library) is commanding to create or destroy any force effects on the device 11. Creation of effects typically occurs when the application program is first executed on the host computer, but also may occur at other times during application execution. For example, when a game program is first executed, the program has a set of force effects which are intended to be used by and with the game. The game typically creates the force effects on the device 11 at startup of the game so the effects will be available immediately for output. Different effects can also be later created during the game if needed. If a GUI is executed on the host, the GUI can immediately create background (primary) force effects on the device 11 so that such effects are immediately available.

If the application has not commanded to create or destroy any effects on the device in step 314, the process continues to step 324, explained below. If the application wishes to create an effect on the device, then in step 316 the host determines if there is any device memory available to store the effect. The host driver (e.g. translation layer or, alternatively, the API) checks the host model of device memory to determine if there is sufficient space. Preferably, the host driver checks for sufficient space both in the effect block 300 and in the parameter block 304; there should be sufficient space in both blocks. If there is not, in step 318 the force effect is discarded, never to be used; preferably, the application program is informed that the effect could not be created, i.e. that the create command failed (in an alternate embodiment of the present invention described below, the effect can be cached by the host). The process then continues to step 334, described below. If there is sufficient memory for the created effect in step 316, then in step 320 the host stores the effect in its memory model and also sends one or more create commands are sent to the device to load the effect in the actual device memory. It should be noted that, in embodiments providing multiple concurrently-running application programs, the device 11 can includes a number of effects standardized in its memory which it can implement if the effects are within the active or background context. Such effects do not need to be downloaded from the host and stored in an effect slot.

As an example, a set of commands and appropriate parameters are shown below to create a periodic effect on the device:

SET_ENVELOPE (offset1, values)
SET_PERIODIC (offset2, values)
SET_EFFECT (effect_index, values, flags, offset1, offset2)

The SET_ENVELOPE command provides a "msg_id" value indicating its command type (identifier). The offset value "offset1" indicates the offset into the parameter block 304 at which to store the accompanying values. The values can be, in this example, the envelope parameters in the data structure 248 shown in FIG. 3, such as impulse time, impulse level, fade time, and fade level. Alternatively, for other types of force effects (e.g. conditions), the envelope parameters can be null, or the envelope command need not even be set. The SET_PERIODIC command similarly provides an identifier and a second offset value "offset2" (different from offset1) at which to store the values in the periodic command. The host 18 knows how much memory space is taken by each effect and parameters and thus can determine the appropriate offsets at which to store the effect data in the device memory without writing over other values. For example, the host knows how much space the envelope parameters of the SET_ENVELOPE command take, and can calculate offset2 to be appropriately located in the parameter block. The values for a periodic command can be those shown in data structure 264 of FIG. 3, for example.

The SET_EFFECT command provides the data to be stored in the effect block 300 of the device memory. After an identifier value, the "effect_index" value indicates which effect slot 302 in which the effect is to be stored. Since the host is modelling the device memory, the host knows which effect slots are available, e.g. open or no longer used. The values can be those shown in structure 240 of FIG. 3, for example. Offset1 and offset2 indicate where the envelope parameters and the periodic parameters, respectively, are stored in the parameter block (if these parameters are not used then the offset values can be null).

It should be noted that the host can store in its memory model either the actual data for the effect, or only the location and size of the portion of memory space that the effect occupies. This is because, at a basic level, the host is only keeping track of available device memory and does not need the actual effect data. However, in a preferred embodiment, the host does store the actual effect data in the memory model. In some embodiments, this allows the host driver to examine effect data and to perform some decisions about whether to send a command to the device. For example, the application may command that a new effect be created which is a periodic wave having a frequency of 20 Hz. The host driver might examine the data for currently-loaded effects in its memory model and find that there is already a periodic wave loaded on the device having a frequency of 25 Hz. The host driver could then decide that the new, 20 Hz periodic is redundant in view of the 25 Hz periodic, and thus ignore the create command (and use the 25 Hz effect whenever the 20 Hz effect is commanded to be played). This type of host driver ability can be performed only if actual effect data is stored in the host memory model. Furthermore, this type of "smart" effect management must be balanced in view of extra processing time and the intentions of the application developer. For example, if the application believes that multiple (redundant) effects are stored in the device and will provide an additive force output, the host driver will not want to simply modify an existing effect but should create a new effect. Also, the efficiency in effect storage gained may not in some cases be worth the extra processing time in managing the effects intelligently. After step 320, the process continues to step 334, described below.

If in step 314 the application has commanded to destroy an effect, then in step 323 an effect slot is freed up in the host memory model. In the preferred embodiment, the device 11 need not be instructed to destroy an effect in the device memory in most cases; rather, old effect data can be simply written over with new effect data in the device memory when the new data is ready to be loaded. The host, however, must free up memory space in its own memory model to allow other effects to be stored and thus the driver should be instructed to destroy an effect to clear the effect data in the memory model. After a destroy command has been received, the host driver knows that the slot of the destroyed effect is available to store a different force effect that may be created in the future by the application program.

In some cases, the device needs to be informed that an effect has been destroyed. For example, a trigger effect can be loaded into device memory and outputs a force if a particular trigger condition occurs, such as a button being pressed on the user manipulatable object. If a trigger effect is being stored in the device memory and is destroyed by the application, that trigger effect cannot be simply left in device memory until it is written over, since a trigger condition may occur before the trigger is overwritten; instead, the device must be immediately informed that the trigger effect should be destroyed or flagged appropriately. Likewise, if an effect is playing when it is destroyed, the device should be immediately informed so that it can turn off the effect. After step 323, the process continues to step 334, described below.

If no create or destroy command is received in step 314, the process checks in step 324 whether the application program on the host is commanding to change an effect state. Herein, an effect state is the current status of the effect, e.g. "playing," "stopped," "paused," etc. If no effect state is being commanded, the process continues to step 334, described below. In a preferred embodiment, steps 314 and 324 are actually function calls made to and implemented by the API which can be made at any time, such that steps 314 and 324 need not be implemented in the sequence shown.

If in step 324 the effect state being commanded is to "play" or "start" (output) a particular force effect to the user, then in step 326 an appropriate "play" command is sent from the host driver to the device. For example, the command can be SET_EFFECT_STATE (effect_index, state, loop_count). The effect_index value indicates the slot in the effect block in device memory and thus the particular force effect which is to be played. The state value indicates to "play" the designated effect. The loop_count value can optionally be used to designate a number of times for the device to repeat playing the entire force effect. In step 328, the host (e.g. translation layer) "tags" the effect (i.e. sets a flag) in its memory model so that the host knows which effects are currently playing of the device (the device also tags the effect, as described in greater detail with respect to FIG. 6). The process then returns to step 314.

If in step 324 an effect state is being commanded to stop playing a particular force effect, then in step 330 an appropriate command is sent from the host to the device. Such a command can be similar to the play command described above except that the state indicates to stop playing the designated effect. In step 332, the host "untags" the designated effect in its model of device memory, i.e. removes the tag for the designated effect. The process then returns to step 314. In other embodiments, additional changes in effect states can also be commanded, such as to pause and resume a force effect, etc.

In step 334, the host can check whether any playing effect has expired or finished, e.g. whether an effect has played to its full duration. The device preferably keeps track of effect duration since it is actually implementing the output of the forces. To inform the host of the expiration of an effect, the device preferably sends a status report to the host, which is checked in step 334. In some embodiments, the host can also independently keep track of the duration of a force effect for memory management purposes, i.e. it can be useful for the host to independently determine when a force effect is finished playing to help determine which cached effects can be loaded. Furthermore, the host can resynchronize its tracked durations if the host and device durations are learned to be out of synchronization. If no effects have expired, the process returns to step 314. If at least one effect has expired, then the process continues to step 336 to untag the expired effect in the host memory model. The process then returns to step 314.

The host can also receive status reports from the device 11 at periodic intervals and/or when the status of force effects and other conditions change, such as an effect starting to play or finishing playing, a deadman switch being activated, power supply interrupted, etc.

Figure 6:
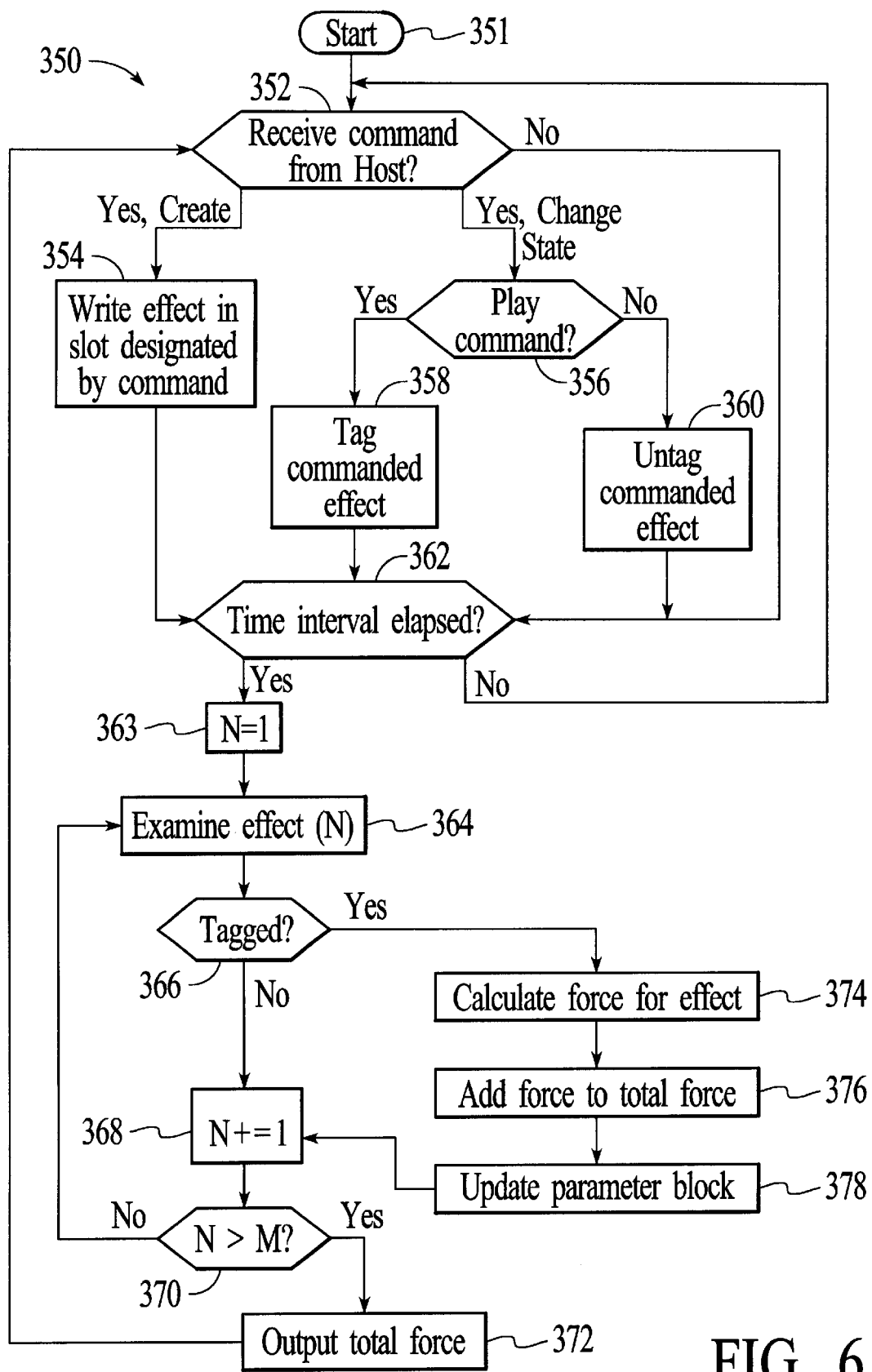
FIG. 6 is a flow diagram illustrating a process for outputting forces running on the force feedback device.

FIG. 6 illustrates a process 350 running on the device 11 which creates and plays designated force effects for the device. The process begins at 351, and at 352, the process checks whether it has received a command from the host computer 18. In the preferred embodiment, the device process is in actuality "event" or interrupt driven such that when a host command is received, an event has occurred, and the device will immediately process it rather than having to check for received commands. Note that this type of event is provided from the host to the device, not from the device to the host. (The device can also send events to the host, such as the movement of the user object into an area corresponding to a graphical object, and status reports to the host at periodic intervals or when events occur; such events are described in co-pending patent application Ser. No. 08/970,953.) If a command has not been received by the host in step 352 (e.g., no command event has occurred), then the process continues to step 362, described below.

If a host command has been received by the device and that command creates a force effect on the device, then in step 354 the process writes the effect data in the device memory in the effect slot designated by the command, i.e. the identifier and the parameters are stored in device memory 134. For example, the local microprocessor 130 can parse the msg_id value (identifier) of each command to determine the type of command. Once the device knows the type of command, it also knows how to store and process each of the succeeding parameters in the command. Thus, the device knows that the second value in the SET_EFFECT command indicates the effect slot in the effect block 302 at which to store the succeeding values. The device also knows to store values at the appropriate offsets provided in the periodic and envelope commands. The process then continues to step 362, described below.

If a command has been received to change the state of an effect already created on the device, then in step 356 the process parses the command to check whether the command is a "play" command. If so, then in step 358 the device "tags" the effect designated in the command. The tag is an indication (such as a flag) that the effect is to be played, to be later examined by the process as detailed below. The process then continues to step 362.

If the command received in step 356 is not a "play" command, then it is a "stop" command to cause the designated force effect to stop playing. Additional commands can also be implemented in other embodiments, such as "pause", which can stop the playing of a force effect in its current state; after a "resume" or "unpause" command is received, the effect would continue playing from the point at which it was paused rather than restarting; or a "stop_all" command which stops the playing of all effects; or a "modify" command, which modifies only the parameters of a previously-loaded effect. In step 360, the process "untags" the effect designated in the command i.e. indicates the designated effect should not be played The process then continues to step 362.

In step 362, the process checks whether the time interval has lapsed, i.e. whether a time event has occurred. In the described embodiment of the present invention, the device operates according to a time interval as measured by a clock. At each time interval, the device 11 should output a force for that interval as contributed to by any playing force effects. For example, the time interval can be 1 millisecond, where the device is expected to process any required information and output a force on the user object 12 every millisecond. When the millisecond time interval passes, it is considered an event which causes the microprocessor to output a force. Thus, if no time interval has elapsed in step 362, the process returns to step 352, e.g. the microprocessor continues to wait for an event such as a command or time interval. Before the next event occurs, the device can perform other tasks such as suspending operation until the next event, processing input sensor values, calculating the next forces, building and sending messages to the host computer, and/or updating force output from the actuators.

If a time interval has elapsed, then a force should be output, and the process continues to step 363 to start the implementation of force output. In step 363, a variable N is set to 1. N indicates the index or slot of an effect in the effect block of device memory. In step 364, the process examines the effect(N), i.e. the effect stored at slot(N). If the examined effect is determined in step 366 to be untagged, then in step 368 N is incremented. In step 370 the process checks whether N>M, where M is the number of effects that the device 11 can store. If N>M, then all the effects have been checked, and the process continues to step 372, explained below. If N is not greater than M, then the process examines the next effect in the device memory in step 364. For an alternate method of examining effects in memory, see the "playlist" embodiment of FIG. 10.

If the effect(N) is determined in step 366 to be tagged, then in step 374 a force is calculated by the device microprocessor 130 based on the data for effect(N), e.g. the parameters such as magnitude, direction, and the like. The microprocessor 130 can use locally-stored force processes, force algorithms, stored force magnitudes, functions of space and/or time, a history of stored motion values of the user object, and/or other instructions to calculate the force as explained above with reference to FIG. 1. For example, the microprocessor can calculate the raw contribution to the output force from the effect and apply an envelope scaling (detailed in U.S. Pat. No. 5,959,613, incorporated by reference herein). In step 376, the calculated force is added to a sum of forces calculated for the other playing effects. In determining the total sum, the device preferably combines all constant forces (e.g., conditions and time-based forces) and limits the constant force sum to a predetermined magnitude, then combines all dynamic forces and limits the dynamic force sum to a predetermined magnitude. Dynamic forces are detailed in U.S. Pat. No. 6,147,674, incorporated herein by reference. The two sums are then added together and the total force sum is output by the actuators of the device 11. Alternatively, all forces can be treated the same and summed together. Furthermore, steps 374 and 376 can be processed together or intermixed when determining the effect force and the total force.

In step 378, any working values in parameter block 304 are updated. For example, such values can include a time value that indicates the amount of time that has expired for the current force effect. If the microprocessor 130 has determined that the time value for the effect has reached the duration limit for the effect, the microprocessor 130 preferably untags the effect so that it will no longer be played. Parameters for the effect can also be updated if a command has required such. After step 378, the process continues to step 368, where N is incremented, and then to step 370, where N is compared to M as described above to determine whether all the effects in the device memory have been checked. If N>M, step 372 is implemented, where the total force is output by the device to the user. The total force is the sum of each force contributed by each playing force effect. The process outputs force signals to one or more actuators to apply a force in the appropriate direction with the appropriate magnitude. The process then returns to step 352 to wait for the next command event or in step 353, the next time interval. The device also preferably sends status reports to the host concerning the status of effects, and these status reports can be sent periodically and/or when the status of an effect changes. Of course, other data and conditions of the device are also reported to the host (sensor data, button data, whether power is being received, deadman switch state, etc.) which are not detailed in process 350.

The processes described with reference to FIGS. 5 and 6 are very efficient. Since the host knows the layout of memory and what is currently stored there, the host need only send one command to load new effects; the host already knows when effects can or cannot be created. In previous embodiments, the host would have to query the device and wait for an answer from the device as whether an effect could be created, thus slowing down communication and response of the device and creating potential confusion when multiple application programs are running and commanding forces.

One aspect of the present invention concerns the time interval event and its implementation as described above for step 353. One way to implement the time interval is to choose a long enough period of time that allows the microprocessor to perform any potential required calculation and still output a force at each time interval. A different implementation of the present invention can provide a smaller time interval which usually is sufficiently long to allow a force to be output at each interval, but which may be insufficient in length in particular circumstances. If the time interval is too short in a particular circumstance, the microprocessor 130 preferably then waits the next discrete time interval to output the force instead of outputting force as soon as it has been determined. This allows a consistent period of force output to be maintained. Preferably, the force output at the second interval point is appropriate to that interval and is not necessarily the force which should have been output at the skipped interval point. For example, if the time interval is specified as 1 ms, the device is usually able to make calculations and output a force every millisecond. However, in some cases such as when a complex command is received, when calculations for several and/or complex force effects are made, or other condition requiring more processing occurs, the extra processing might cause a delay in the output of the force past the 1 ms interval point. Instead of outputting the force when the calculation is complete, the process delays the output of the force until the next discrete interval point, i.e. after an integer number of time intervals have passed. Furthermore, the process also computes the force which should be output at the second interval rather than the first. For example, if the force is based on a periodic function, then the force that should be output at the second interval can be determined using the periodic function. This maintains the fidelity of the force sensation to the user and is important for time-based effects. This methods allows a faster update interval with only occasional delays in force output, thus providing better overall force output quality than if a longer time interval is used.

Effect Caching on the Host Computer

One limitation of force feedback devices is the relatively small amount of memory included on the devices. To create a realistic, immersive environment, many different force effects should be output by an application program. However, only a small number of effects can usually be stored on a force feedback device, often less than the application program wishes to use. In current implementations, if an application program commands the creation of more force effects than can be stored by the device, the effects that cannot be stored are simply discarded and not output, and the application program is informed of the failure (the application program can react to the failure in any way the developer desires). One way around the limitation is to provide a "smart" application program that only outputs a small number of force effects at once which can all be stored on the device; when the application wishes to create and output a new, different force effect, it destroys a previously-used effect and commands a new force effect. However, ideally the application program should be able to output as many force effects as it wishes without having to consider the memory limitations of the force feedback device and without having to spend extra processing time swapping force effects.

Effect caching by the host is a way to use to the host's memory in addition to limited device memory to store as many force effects as an application program needs to use. Host memory is used as an overflow cache for the device to store any effects not able to be stored on the device. In the view of the application program, all commanded effects have been stored on the device, so that the application program need never receive a failure message for running out of device memory. A driver program on the host (such as the translation layer, API or other library, or a lower-level driver) handles all the effect caching at a lower level than the application program.

Figure 7:
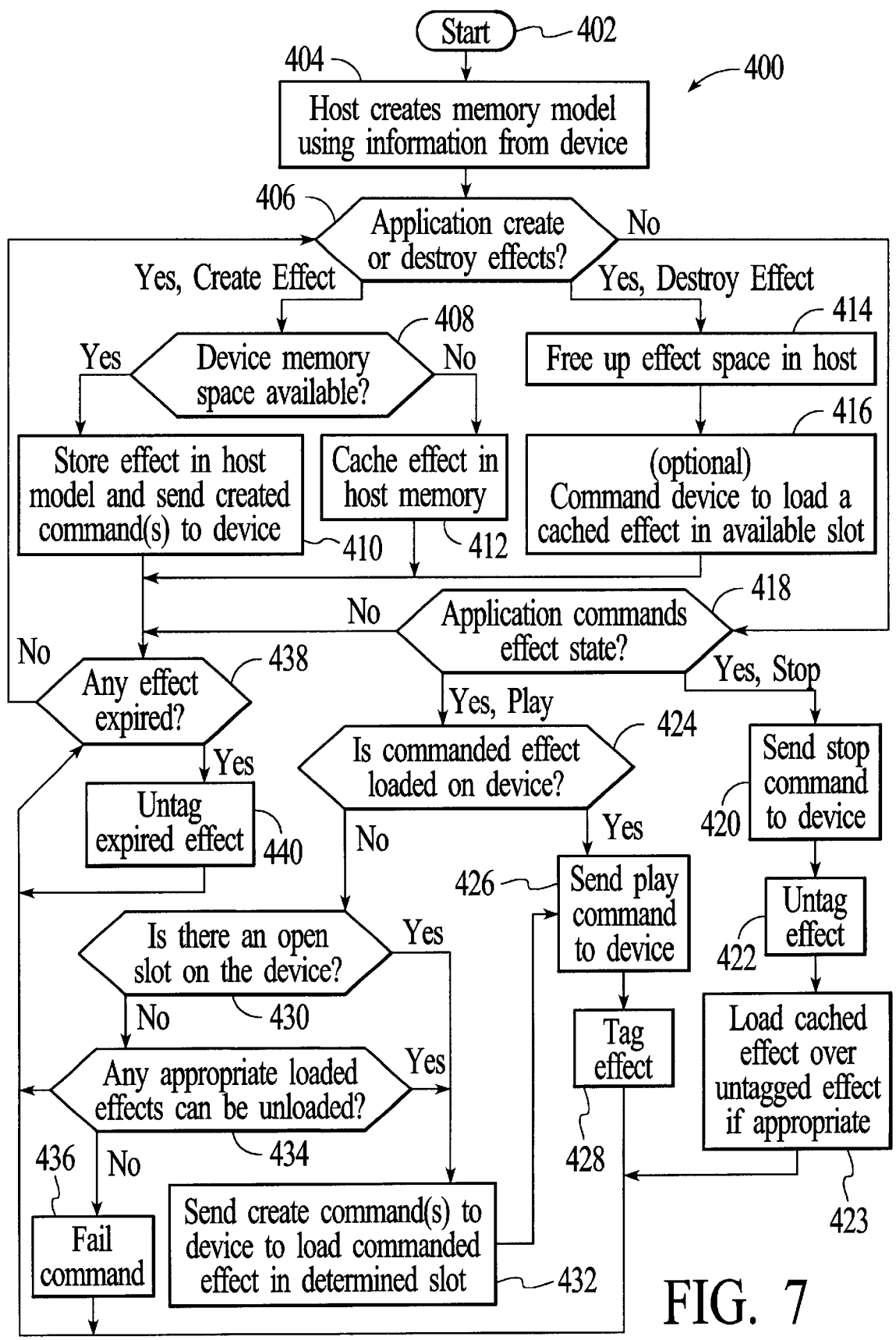
FIG. 7 is a flow diagram illustrating a method of the present invention for host management of force effects using a device memory representation and host caching of force effects.

FIG. 7 is a flow diagram illustrating a memory management process 400 from the point of view of the host (e.g. the translation layer or other levels of the host architecture in other embodiments) using a host cache to store effects. The term "cached effect" herein refers to an effect whose data is stored in the host memory but is not stored in the device memory due to the device memory being full. The force effect is cached by the host when the application program (via the API) requests to create a force effect on the device and the device has no effect slots available to store the effect. Instead of returning a "failure" message to the application program, the host caches the force effect in the host's memory. Preferably, this is done by a driver on the host so that the application program believes that the device has loaded all effects. It should be noted that the order of steps described below is only an example, and that the various checks and events can occur in at any time or in different sequences as function calls, interrupts, and/or in parallel (multitasking) in various embodiments.

FIG. 7 illustrates a process 400 running on host 18. The process 400 is similar to process 310 of FIG. 5 at many steps. Process 400 begins at 402, and in step 404, the host 18 creates a memory model similarly to step 312 of FIG. 5. In step 406, the process determines whether the application program (e.g. through the API) is commanding to create or destroy any force effects on the device 11. If the application does not currently wish to create or destroy any effects on the device, then step 418 is initiated, explained below. If the application wishes to modify a force effect by creating an effect on the device, then in step 408 the host checks the host model of device memory to determine if there is any device memory available to store the effect. If there is not, in step 412 the force effect is cached in the host memory but is not loaded into the device memory. Since host memory is for many practical purposes unlimited when compared to device memory, the host cache should be able to store all force effects created by the application program. The cached force effects are preferably included in the same device memory model as the actual loaded effects (see FIGS. 9a and 9b). The process then continues to step 438, described below. If there is sufficient memory for the created effect in step 408, then in step 410 one or more create commands are sent to the device to load the effect on the device and the effect is also stored in the host memory model. The process then continues to step 438, described below.

If in step 406 the application has commanded to destroy an effect, then in step 414 an effect slot is freed up on the host, creating an open slot in the device memory model. In next optional step 416, the host can send a create command to the device to load a cached effect into the empty slot in device memory. Since there is an empty slot in device memory, and since the host cache may include effects that the application program assumes are loaded on the device, it can be efficient to have all the slots in the device memory filled. The host can load a cached effect based on the order in which it was cached, e.g. the effect that was cached first has the highest priority to be loaded. Alternatively, the host can prioritize the cached effects in some way and load the effect having the highest priority. For example, trigger effects may be considered higher priority than other effects. Effects can also be assigned priority based on several factors including the effect's magnitude, type, duration, or age, and/or a weighted combination of several of these factors. In other embodiments, step 416 is not implemented and the host can load cached effect data to the device at the time the effect is commanded to be played, as in step 432 below. The process then continues to step 438, described below.

If no create or destroy command is made in step 406, the process checks in step 418 whether the application program on the host is commanding an effect state. If in step 418 a "stop" command has been made, then in step 420 the host sends a stop command to the device similarly to step 330 of FIG. 5. In step 422 the host untags the effect in the host memory model similarly to step 332 of FIG. 5. Next step 423 is similar to step 416, described above, where the host can send a create command to the device to load a cached effect into the memory space occupied by the effect that was commanded to stop. As explained above, the host can determine which of the cached effects has the highest priority to be loaded. However, step 423 has the additional step of checking whether any cached effect, such as the highest-priority cached effect, has a greater priority than the stopped effect. In some cases, the stopped effect may have a higher priority than any cached effects and thus should remain in device memory, e.g. in an implementation placing high priority on trigger effects, the stopped effect may be a trigger and the cached effects may be periodics with lesser priority. Priority of effects is described below with respect to step 434. The process then continues to step 438, described below.

If in step 418 a "play" command was made, then in step 424 the process checks whether the commanded effect is already loaded on the device. The host can maintain a list indicating which of the effects have been loaded to the device and which have been cached on the host, as shown in FIGS. 9*a* and 9*b*. If the commanded effect has previously been loaded on the device, then the play command is sent to the device in step 426 similarly to step 326 of FIG. 5, and the effect is tagged in step 428 in the host memory model similarly to step 328 of FIG. 5 (the device also tags the effect, as described in greater detail with respect to FIG. 6). The process then continues to step 438.

If the commanded effect(s) has not been loaded on the device, i.e., has been cached on the host, then in step 430 the process checks whether there is an open slot in the device memory in which to store the cached effect. An open slot does not have any effect data stored therein. If there is an open slot, then the process continues to step 432

If it is determined that the commanded effect (or a waiting effect; in step 414 any waiting effect that is to loaded can be considered a "commanded effect") can be loaded on the device, then in step 432 the host sends a create command to the device to create the commanded effect in the available effect slot of the device memory in step 416, e.g. the effect is stored in the effect block and parameter block (if such a memory structure is being used), as explained with reference to step 320 of FIG. 5. The process then continues to step 426 to send the "play" command for the created effect as explained above. After the effect is tagged in step 428 on the device and the host, the process continues to step 438, described below.

If there is no open slot on the device in step 430, then in step 434 the process checks whether any of the loaded effects can be "swapped" with the commanded effect, e.g. whether the loaded effect can be unloaded (written over) in its device memory slot and the commanded effect stored in its place.

The process can use many different criteria to determine if any slots are available in the device memory. In one embodiment, the process checks whether all the loaded effects are currently playing; the slots of all of the loaded effects that are not currently playing might be considered available slots. The host can simply write the commanded effect in the first available slot of memory.

In some embodiments, time-based (temporal) criteria can be used. For example, a long period of time may have passed since a loaded effect was last played, such that this effect can be considered to be expendable and the slot it occupies can be available for the newly-commanded effect. Such an expendable effect may perhaps no longer be in immediate use by the application program and thus is most eligible to be unloaded. The loaded effect having the longest time since last played can be considered the most eligible to be unloaded.

Figure 8:
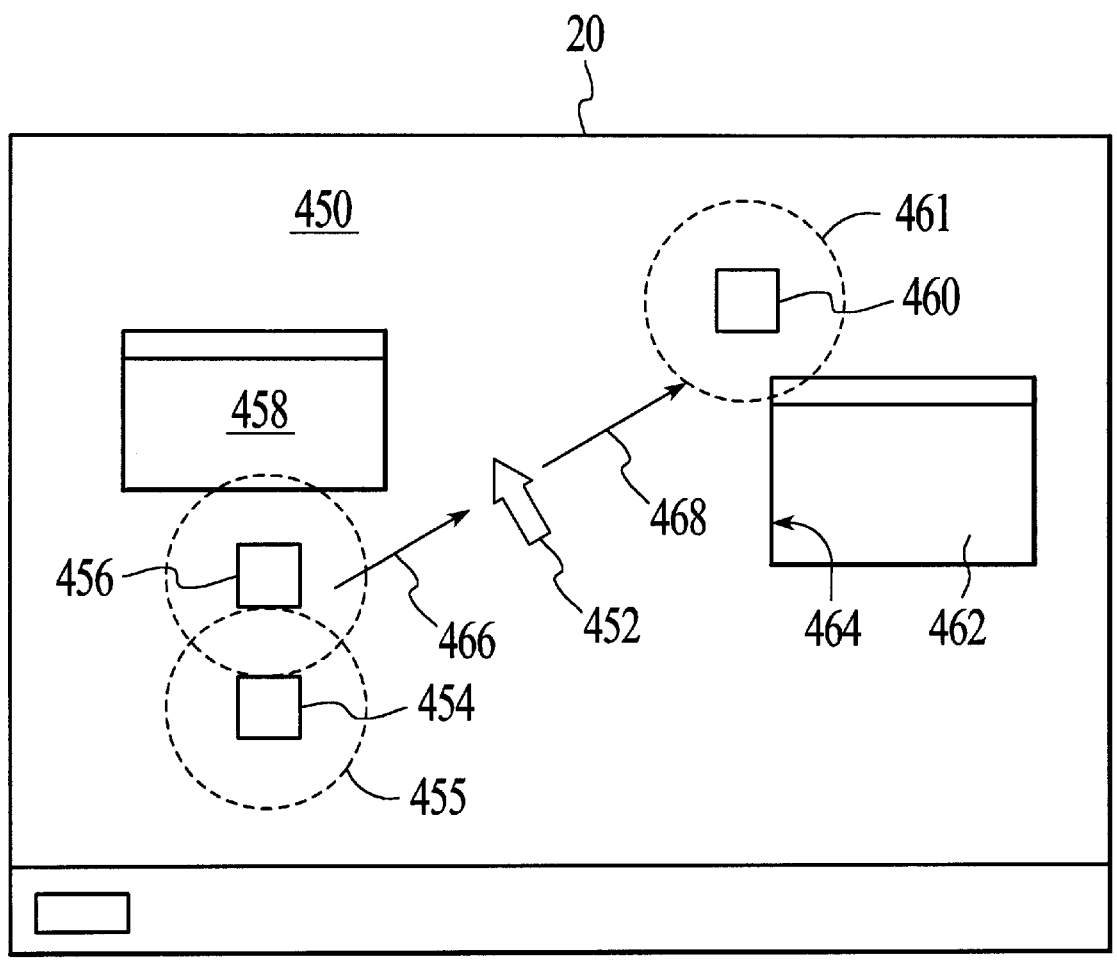
FIG. 8 is a diagrammatic illustration of a graphical user interface and cursor for illustrating the spatial caching of the present invention.

In other embodiments, instead of or in addition to using such time-based criteria, spatially-based criteria can be used to determine slot availability. This method predicts movement of the user object 12 by the user to help determine which effects should be loaded on the device. FIG. 8 illustrates one use of spatial caching. In a GUI 450 displayed on screen 20, the user of device 11 can move a cursor 452 to different areas of the GUI. Many force effects are output based on the cursor's location in the GUI. For example, an attractive gravity field can be output to bias the cursor/user object to an icon 454 when the cursor is moved within an external range 455 around the icon. Or, a snap force can be output when the cursor moves over a window border 464 of window 462.

Using spatial criteria, those force effects that are associated with graphical objects in the current path of movement of the cursor can be considered more essential since they are more likely to have to be output in the immediate future when the cursor moves to the associated graphical objects. Those effects associated with graphical objects away from the current path of the cursor are more expendable since they are less likely to require immediate output. Thus, the host can determine the current direction (and velocity, if desired) of the cursor 452 to determine which graphical objects and effects are in the current path of movement of the cursor and which graphical objects and effects are far away from the current path of movement. The effect associated with the graphical object furthest away from the cursor path can be considered the most expendable effect and can be unloaded and replaced by an effect closer to the cursor path of movement.

For example, in FIG. 8, it has been determined by the host, e.g. by examining a history of two or more cursor positions, that the cursor 452 is currently moving in the direction 466. The cursor is likely to continue moving in the direction 468 (the velocity of the cursor can optionally influence this determination; if the cursor is moving fast, it is much more likely to continue in the same direction 466 than if it is moving slower or is currently stopped). Therefore, the icons 454 and 456 and the window 458 are away from the likely path of the cursor and any force effects associated with these objects may not be required to be output in the immediate future. However, the cursor may be heading directly to icon 460; since the attractive field associated with the icon range 461 may have to be output very soon, the attractive field effect has a much higher spatial priority than the effects associated with objects 454, 456, 458. Window 462 is not in a direct a path of the cursor as is icon 460, but since it is near the path 468, the effects associated with window 462 should have a higher spatial priority than the effects of objects 454, 456, and 458 and should be loaded in place of one of the lower-priority effects.

In a more general sense, the host can monitor the motion of the user object 12 and swap multiple effects on the device with cached effects that are more likely to be output in the immediate future. Spatially-based criteria also can be used in conjunction with time-based criteria for determining memory slot availability.

Referring back to FIG. 7, a priority system can also be used to determine which effect is most eligible to be unloaded or swapped out and replaced with a cached effect. For example, each type of force effect can be assigned a priority in an absolute priority system, where each effect can be given a rank in a priority list according to the type of effect. For example, a damping effect may be considered lower priority than a vibration periodic effect that may be more noticeable to the user. A "trigger" effect preferably has a higher priority than non-trigger effects. A trigger effect is an effect that is not always playing, but which must be immediately output if a predefined event or condition occurs. For example, a gun recoil trigger effect can be played each time a button on the device 11 is pushed by the user. Since trigger effects need to be played quickly, they should remain loaded in device memory as much as possible. Furthermore, an effect that is currently playing can have a higher priority than non-playing effects (including trigger effects not currently being played), since it can be disruptive to a user to suddenly stop playing an effect before it has finished. However, this may not be the case when using spatial caching since an effect currently playing can be immediately turned off if the user moves the user object 12 to a different location.

The priority of the commanded effect is compared to the priorities of the loaded effects; the first effect having a lower priority is eligible to be swapped with the commanded effect. Alternatively, all the loaded effects can be examined, and the effect having the lowest priority can be eligible to be replaced with the commanded effect if the commanded effect has a higher priority than that effect. In some embodiments, only effects not currently playing are examined for availability; alternatively, all the loaded effects, whether currently playing or not, can be examined and the lowest priority effect unloaded.

Furthermore, in some embodiments the priorities of effects for caching purposes can be changed by an operating system, application, or other program or user. For example, a developer of a force feedback application program can in some embodiments assign priorities to particular effects so that the developer has the flexibility to designate the importance of various effects to his or her particular application program. A priority system for a particular application could be provided to the host driver upon start-up of the application program. Such a priority system could be stored in a context for that application program, as described for FIG. 2, for example. In such a system, the developer should be able to assign the highest possible priority to any effect desired, which will cause a commanded effect having such a priority to be always loaded on the device regardless of which effects are already loaded. This allows the application to directly command force feedback on the device with no concerns about receiving failure messages.

In addition, effects can be organized into various categories or "suites", where the effects in a category are assigned priorities and/or where only particular categories need be in use at a particular time. This allows effects from other "inactive" categories to be unloaded from the device and effects included in the "active" category to be loaded. The priorities in some cases can be assigned by the developer of an application program. For example, a developer of a game application can make a category "On Land" which includes a collision effect and a weapon fire effect as priority 1, an engine rumble effect as priority 2, and a "slight breeze" effect as priority 3. The developer also can make a category of "In Water" including a water resistance (damping) effect and explosion effect as priority 1, a "strong current" effect as priority 2, and "hitting sea kelp" as priority 4. The application program calls the API to inform the host driver which category is currently in use, and when to switch categories. When, in the game, the user controls a vehicle to move from land into water, the application program indicates that the "On Land" category of effects should be switched to the "In Water" category of effects. The host driver then knows that all "On Land" effects are free to be unloaded from the device memory and that the "In Water" effects should be loaded. Furthermore, since each effect has been assigned a priority, the host driver knows that if there is not enough slots to store all of the "On Water" effects, the water resistance and explosion effects should be loaded before the lower priority effects. Other uses of categories and priorities is described in co-pending patent application Ser. No. 09/306,002, filed concurrently herewith, and incorporated herein by reference.

The priority system described above can also be combined with other criteria, such as time-based and/or spatially-based criteria described above. For example, a priority can be assigned to a loaded effect based on multiple factors such as its effect type, its application-assigned priority, its time-based criteria, and/or its spatially-based criteria. For example, some force effects may be "one-shot" effects which are played once and then not used. These effects could have an initially high priority; once they are played, their priority can go to zero. In some embodiments, a total weighted priority can be assigned to the effect based on these factors and any weights assigned to the factors. The weighted priority of the loaded effect can then be compared to the (weighted) priority of the commanded effect to determine if the loaded effect can be swapped with the commanded effect.

Furthermore, other criteria may also determine whether the commanded effect can be loaded. When implementing more sophisticated comparisons, weights, etc. the tradeoffs between available host processing power and gains in caching efficiency should be considered.

A further consideration is whether the commanded effect can actually fit into the memory space occupied by a particular loaded effect. All effects occupy the same amount of space in the effect block 300, but different effects occupy different amounts of space in the parameter block 304 based on how many parameters are used and workspace required for an effect. If the commanded effect will not fit into the space occupied by the loaded effect with the lowest priority, then that loaded effect should be excluded from comparison and other loaded effects are examined for eligibility. Alternatively, if the examined loaded effect does not occupy sufficient space for the commanded effect, the loaded effect can still be unloaded or destroyed. The process then examines another low-priority loaded effect and unloads that effect as well; this process may continue until sufficient space is freed for the commanded effect.

If it is determined that the commanded effect can be loaded over a loaded effect in step 434, then in step 432 a create command(s) is sent to the device to load the data for the commanded effect in the space of the expendable effect. It should be noted that the expendable effect is still available to be commanded by the application since it still resides in the host cache and memory model. The process then continues to step 426 to send a play command to the device and play the commanded effect as described above.

If it is determined that the commanded effect cannot be loaded in step 434, then in step 436 the command is given a failure status, and the commanded effect is not loaded to the device. Of course, only the "play" command itself has failed; the effect data still resides in the host cache and memory model. In some embodiments, the application program can remain ignorant of the failure; this allows the application program to believe that the force effect is playing properly and to issue another play command for that effect at a later time without disruption or additional processing (and the later command may succeed); in addition, this prevents the application from overreacting to the failure. In other embodiments, it may be desirable to inform the application program of any failure to play an effect so that the application program can compensate for the failure in other ways. The application program can be provided with varying degrees of information; for example, that the effect has been cached but did not play, or that the effect simply did not play. The process continues to step 438, described below.

In an alternate embodiment, the process can mark a failed cached commanded effect as "waiting." Effects which have a status of "waiting" can be given a high priority to be loaded if any of the effect slots on the device should open up in future iterations. The host can maintain the effect's duration while it has a waiting status so that if an effect slot opens up, the host will know whether the waiting effect should still be output and if so, at which point in its duration. Thus, only effects which have a relatively long duration need be given a waiting status. For example, if a periodic effect having a duration of 4 seconds is waiting to be loaded on the device, the host keeps track of the duration; if 2 seconds have elapsed before an effect slot is available, the host commands the periodic effect starting at the third second. If four seconds have elapsed before an effect slot becomes available, then the host should cancel the effect since its duration has expired. In such a waiting embodiment, the process can check whether any waiting effects can be loaded to the device after an effect is untagged in step 422 or destroyed in step 414; if so, the create command of step 416 or step 423 can be sent for the waiting effect (if the waiting effect has a high enough priority), and a play command can be sent, if appropriate, to play the formerly-waiting effect. Also, in steps 430 and 434, a waiting effect can be assigned a priority or its existing priority can be increased due to the waiting status, and the waiting effect may be loaded before a currently-commanded effect if its priority is higher. It should be noted that in many implementations, such a waiting status is unnecessary, since many force effects are too short in duration to justify the extra processing required. In addition, devices having several effect slots can usually maintain realistic forces even if some force effects are discarded.

In step 438, the host can check whether any playing effect has expired, similarly to step 334 of FIG. 5. If no effects have expired, the process returns to step 406. If at least one effect has expired, then the process continues to step 440 to untag the expired effect in the host memory model. In other embodiments, steps 438 and 440 can be omitted. The process then returns to step 406.

Force effect caching on the host can also be useful in other memory management paradigms in addition to the implementation described above where the host maintains a device memory model. For example, if only the device knows whether a commanded force effect can be stored in device memory, the device is queried by the host. If the device says that it cannot store any more effects, a driver on the host can create and cache the effect and inform the application program that its effect has been created, rather than indicating that the create command has failed.

It is important to note that the process described above preferably is implemented at a level on the host computer lower than the application program controlling the forces. The application program thus is unaware of all the effect processing that may be going on. This relieves the application program from having to determine which effects should be destroyed and which should be created at different times, and allows the developer of the application to focus on other important aspects of application and force design.

FIGS. 9a and 9b are diagrammatic illustrations of the memory of the host and device when caching a force effect as explained in FIG. 7. In the example of FIG. 9a, a device has five effect slots 480, and all five slots have been filled with a force effect as shown. Two of the effects are currently playing (tagged) as shown in column 482. The host, meanwhile, is storing a memory model 484 that includes seven force effects 485. This is because the application program has created seven force effects and believes that all seven effects have been created on the device. Therefore, two of the created force effects have been cached by the host since the device can only store five effects.

As shown in column 486, the host driver keeps track of which force effects have actually been created (loaded) on the device. The host driver also keeps track in column 488 of which force effects are currently playing, i.e. output to the user. Thus, in the example shown, the host knows that the effects in slots 1, 3, 4, 5, and 6 of the host are loaded in the available slots of the device. The slots of the host and the device need not correspond since the host loads and unloads different effects from the device during application execution; however, the host driver does need to know which slots of the device the effects are stored so that the proper index into the effect block may be sent to the device. The host also knows that the effects in slots 3 and 4 of the host are currently playing on the device. If a cached effect is commanded to be played by the application, such as the Spring effect in slot 7 of the host, then the host can examine the loaded effect slots 480 to determine which slot the Spring effect can be loaded to. For example, the Periodic1, TriggerForce, and Periodic2 effects on the device are not currently playing; since Trigger effects have a high priority, the Periodic1 or Periodic2 effect could likely be unloaded and the Spring2 effect loaded in the available slot, depending on the conditions of availability and priorities used. In addition, in some embodiments the host can also maintain a "priority" field for each effect in the model 485 to allow the comparison of priorities for loading purposes.

FIG. 9b illustrates an embodiment 490 providing the waiting feature described above as an alternative to step 436 in FIG. 7. The host keeps track of which force effects are "waiting" as shown in column 492. Thus, in the example shown, the effects in slots 1, 3, 4, 5, and 6 of the device have been loaded to the device and are all tagged, meaning they are all being currently output. The ConstantForce1 effect in slot 2 of the host has been commanded by the application program to be played, but there is no available effect slot to store the commanded effect. The host therefore marks the commanded effect as "waiting" and monitors the device memory to determine if the commanded effect can be later loaded to the device and played. The host internally maintains the duration of the ConstantForce1 effect so as to output the correct force magnitude, direction, etc. at the point in time when the waiting effect can be actually loaded to the device.

Figure 10:
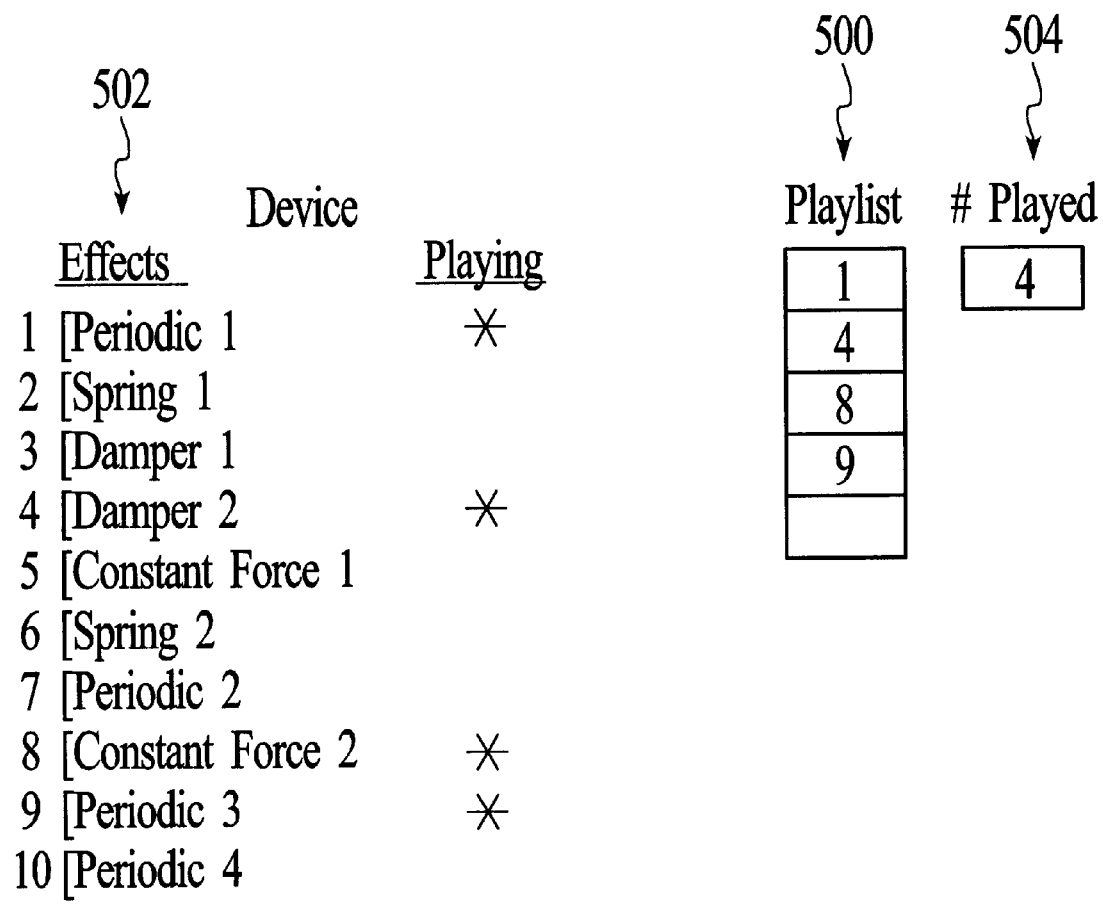
FIG. 10 is a diagrammatic illustration of device memory and a playlist of the present invention.

FIG. 10 is a diagrammatic illustration of an alternate "playlist" embodiment of the device memory of device 11. In the above embodiments as shown in steps 362–378 of FIG. 6, the device 11 examined each effect slot in order and checked whether each effect was tagged (playing); if the effect were tagged, a force based on that effect was added to a total force that was output on the user manipulatable object 12. FIG. 10 illustrates an alternate method in which a playlist 500 is stored in device memory. An effect block 502 is stored on the device and host as explained above (a parameter block (not shown) may also be stored). When an effect is tagged by process 310 (e.g. in step 328 of FIG. 5), a pointer to that effect or index into the effect block is stored in the next available slot in the playlist 500. Thus, only the topmost slots of the playlist are preferably filled, with any open slots at the bottom of the list. The total number of tagged effects is stored as a number in a memory location 504, and is updated whenever an effect is tagged or untagged. In most implementations, the number of slots in the playlist 500 can be less than the number of effect slots implemented in the effect block 502, since the number of playing effects is likely to be smaller than the total number of effects stored on the device. For example, the device may be able to store 30 effects, but the playlist might only require 10 slots.

When an effect finishes or is stopped by a command, the effect is removed from the playlist. If there are other effects still playing which are located further down in the list past the removed effect, then one or more of these later effects can be moved to maintain a continuous playlist without gaps. For example, the last effect in the playlist can be moved to the location at which the removed effect used to be stored. In addition, after the effect is removed from the playlist, the total number of effects in location 504 is decremented.

The efficiency of the playlist 500 is demonstrated when the playing process 350 of FIG. 6 examines the device memory to determine which effects are to be output as forces. Instead of sequentially examining each slot in the effect block 502 as described in FIG. 6, the process instead simply examines the memory location 504 for the number of effects currently tagged (playing). Once this number T is known, the process then looks at the top T entries in the playlist 500 to determine which particular effects are playing, and calculates forces for those effects. This is much more efficient than examining the tag field for each entry in the effect block 502, especially when there are many effects in the effect block 502. Furthermore, if no effects or only a small number of effects are playing, no processing time is wasted checking each slot in the effects table.

While this invention has been described in terms of several preferred embodiments, it is contemplated that alterations, permutations and equivalents thereof will become apparent to those skilled in the art upon a reading of the specification and study of the drawings. Also, the various features of the embodiments herein can be combined in various ways to provide additional embodiments of the present invention. Furthermore, certain terminology has been used for the purposes of descriptive clarity, and not to limit the present invention. It is therefore intended that the following appended claims include all such alterations, permutations, and equivalents as fall within the true spirit and scope of the present invention.

What is claimed is:

1. A method for providing force effects with a force feedback device having local control of the output of force sensations, said force feedback device coupled to a host computer, the method comprising:

creating a representation of device memory, said device memory being provided on said force feedback device, said representation being allocated in memory of said host computer, wherein an application program is running on said host computer;

receiving a force effect load command from said application program, said force effect load command instructing that data for a force effect be stored in said device memory storing said data for said force effect in said representation of device memory, wherein a greater number of said force effects can be stored in said representation than in said device memory;

determining whether said device memory can store said force effect by examining said representation of device memory; and if said device memory can store said force effect, sending said data for said force effect to said force feedback device to be stored in said device memory, wherein said force feedback device uses said data to control a force output to a user of said force feedback device.

2. A method as recited in claim 1 wherein if said device memory is full and cannot store said force effect, further comprising delaying the sending of said force effect to said force feedback device.

3. A method as recited in claim 1 wherein when a particular one of said force effects that is stored in said representation and not stored in said device memory is commanded to be played by said application program, said particular force effect is sent to said device memory to replace a force effect stored in said device memory.

4. A method for managing the storage of force effects in a force feedback system, the force feedback system including a force feedback device connected to a host computer, the method comprising:

receiving a force effect create command by a driver running on said host computer, said command sent from an application program running on said host computer, said force effect create command instructing that particular force effect data for a particular force effect be stored in memory local to said force feedback device;

determining whether said local memory has sufficient space to store said particular force effect data;

if said local memory does have said sufficient space, sending said particular force effect data to said force feedback device to be stored in said local memory; and if said local memory does not have said sufficient space, storing said particular force effect data in a cache implemented in memory of said host computer instead of said local memory.

5. A method as recited in claim 4 further comprising receiving a command by said driver from said application program to output said particular force effect to a user of said force feedback device, wherein if said particular force effect data is stored in said cache, said driver swaps said particular force effect data with loaded force effect data in said local memory and instructs said force feedback device to output said particular force effect.

6. A method as recited in claim 5 wherein said driver creates a representation of said local memory in said memory of said host computer.

7. A method as recited in claim 6 wherein said representation and said device memory each include an effect block and a parameter block, wherein an identifier of said particular force effect is stored in said effect block and at least one parameter for said particular force effect is stored in said parameter block.

8. A method as recited in claim 6 wherein said determining whether said local memory has sufficient space includes examining said representation for sufficient space.

9. A method as recited in claim 5 wherein said determining whether said local memory has sufficient space includes querying said force feedback device and receiving a response indicating whether sufficient space is available.

10. A method as recited as claim 5 wherein when said local memory does not have sufficient space, said particular force effect is given a waiting status such that said force effect data for said particular force effect is sent to said device memory at a later time.

11. An apparatus for managing the storage of force effects in a force feedback system, the force feedback system including a force feedback device connected to a host computer, the method comprising:

means for receiving a force effect create command by a driver running on said host computer, said command sent from an application program running on said host computer, said force effect create command instructing the particular force effect data for a particular force effect be stored in memory local to said force feedback device;

means for determining whether said local memory has sufficient space to store said particular force effect data, wherein if said local memory does have said sufficient space, said particular force effect data is sent to said force feedback device to be stored in said local memory, and wherein if said local memory does not have said sufficient space, said particular force effect data is stored in a cache implemented in memory of said host computer instead of said local memory; and means for receiving a command by said driver from said application program to output said particular force effect to a user of said force feedback device, wherein if said particular force effect data is stored in said cache, said driver swaps said particular force effect data with loaded force effect data in said local memory and instructs said force feedback device to output said particular force effect.

12. An apparatus as recited in claim 11 wherein said driver creates a representation of said local memory in said memory of said host computer, wherein said means for determining whether said local memory has sufficient space includes means for examining said representation for sufficient space.

* * * * *